US009043580B2

(12) United States Patent
Henry et al.

(10) Patent No.: US 9,043,580 B2
(45) Date of Patent: May 26, 2015

(54) ACCESSING MODEL SPECIFIC REGISTERS (MSR) WITH DIFFERENT SETS OF DISTINCT MICROINSTRUCTIONS FOR INSTRUCTIONS OF DIFFERENT INSTRUCTION SET ARCHITECTURE (ISA)

(75) Inventors: G. Glenn Henry, Austin, TX (US); Terry Parks, Austin, TX (US); Rodney E. Hooker, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 656 days.

(21) Appl. No.: 13/413,346

(22) Filed: Mar. 6, 2012

(65) Prior Publication Data
US 2013/0067199 A1 Mar. 14, 2013

Related U.S. Application Data

(63) Continuation-in-part of application No. 13/224,310, filed on Sep. 1, 2011, now Pat. No. 8,880,851, and a continuation-in-part of application No. 13/333,520, filed on Dec. 21, 2011, and a continuation-in-part of (Continued)

(51) Int. Cl.
*G06F 9/30* (2006.01)

(52) U.S. Cl.
CPC ........ *G06F 9/30174* (2013.01); *G06F 9/30101* (2013.01); *G06F 9/30076* (2013.01);
(Continued)

(58) Field of Classification Search
None
See application file for complete search history.

(56) References Cited

U.S. PATENT DOCUMENTS 5,226,164 A 7/1993 Nadas et al.
5,235,686 A 8/1993 Bosshart
(Continued)

FOREIGN PATENT DOCUMENTS

CN 101866280 A 10/2010
EP 0709767 5/1996
(Continued)

OTHER PUBLICATIONS

Karaki, Hussein et al. "Multiple Instruction Sets Architecture (MISA)." Energy Aware Computing (ICEAC), 2011 International Conference on, IEEE. Nov. 30, 2011 thru Dec. 2, 2011. pp. 1-6, XP032099542, ISBN: 978-1-4673-0466-5.

(Continued)

*Primary Examiner* — Kenneth Kim
(74) *Attorney, Agent, or Firm* — E. Alan Davis; James W. Huffman; Eric W. Cernyar

(57) ABSTRACT

A microprocessor capable of running both x86 instruction set architecture (ISA) machine language programs and Advanced RISC Machines (ARM) ISA machine language programs. The microprocessor includes a mode indicator that indicates whether the microprocessor is currently fetching instructions of an x86 ISA or ARM ISA machine language program. The microprocessor also includes a plurality of model-specific registers (MSRs) that control aspects of the operation of the microprocessor. When the mode indicator indicates the microprocessor is currently fetching x86 ISA machine language program instructions, each of the plurality of MSRs is accessible via an x86 ISA RDMSR/WRMSR instruction that specifies an address of the MSR. When the mode indicator indicates the microprocessor is currently fetching ARM ISA machine language program instructions, each of the plurality of MSRs is accessible via an ARM ISA MRRC/MCRR instruction that specifies the address of the MSR.

18 Claims, 12 Drawing Sheets

Related U.S. Application Data application No. 13/333,572, filed on Dec. 21, 2011, now Pat. No. 8,880,857, and a continuation-in-part of application No. 13/333,631, filed on Dec. 21, 2011, now Pat. No. 8,924,695, said application No. 13/333,520 is a continuation-in-part of application No. 13/224,310, said application No. 13/333,572 is a continuation-in-part of application No. 13/224,310, said application No. 13/333,631 is a continuation-in-part of application No. 13/224,310.

(60) Provisional application No. 61/473,062, filed on Apr. 7, 2011, provisional application No. 61/473,067, filed on Apr. 7, 2011, provisional application No. 61/473,069, filed on Apr. 7, 2011, provisional application No. 61/604,561, filed on Feb. 29, 2012, provisional application No. 61/537,473, filed on Sep. 21, 2011, provisional application No. 61/541,307, filed on Sep. 30, 2011, provisional application No. 61/547,449, filed on Oct. 14, 2011, provisional application No. 61/555,023, filed on Nov. 3, 2011.

(52) U.S. Cl.
CPC ............ *G06F9/30112* (2013.01); *G06F 9/3017* (2013.01); *G06F 9/30189* (2013.01); *G06F 9/30196* (2013.01)

(56) References Cited

U.S. PATENT DOCUMENTS

| | | |
|---|---|---|
| 5,307,504 A | 4/1994 | Robinson et al. |
| 5,396,634 A | 3/1995 | Zaidi et al. |
| 5,438,668 A | 8/1995 | Coon et al. |
| 5,481,693 A | 1/1996 | Blomgren et al. |
| 5,574,927 A | 11/1996 | Scantlin |
| 5,619,666 A | 4/1997 | Coon et al. |
| 5,638,525 A | 6/1997 | Hammond et al. |
| 5,664,215 A | 9/1997 | Burgess et al. |
| 5,685,009 A | 11/1997 | Blomgren et al. |
| 5,745,722 A | 4/1998 | Matsumoto et al. |
| 5,752,014 A | 5/1998 | Mallick et al. |
| 5,781,457 A | 7/1998 | Cohen et al. |
| 5,796,981 A | 8/1998 | Abudayyeh et al. |
| 5,832,205 A | 11/1998 | Kelly et al. |
| 5,832,297 A | 11/1998 | Ramagopal et al. |
| 5,854,913 A | 12/1998 | Goetz et al. |
| 5,887,152 A | 3/1999 | Tran |
| 5,926,642 A | 7/1999 | Favor |
| 5,926,646 A | 7/1999 | Pickett et al. |
| 5,946,483 A | 8/1999 | Boutaud et al. |
| 5,961,633 A | 10/1999 | Jaggar |
| 6,076,155 A | 6/2000 | Blomgren et al. |
| 6,178,482 B1 | 1/2001 | Sollars |
| 6,185,668 B1 | 2/2001 | Arya |
| 6,374,346 B1 | 4/2002 | Seshan et al. |
| 6,442,679 B1 | 8/2002 | Klauser et al. |
| 6,496,922 B1 | 12/2002 | Borrill |
| 6,571,316 B1 | 5/2003 | D'Souza et al. |
| 6,611,909 B1 | 8/2003 | Roos et al. |
| 6,647,489 B1 | 11/2003 | Col et al. |
| 6,651,159 B1 | 11/2003 | Ramesh et al. |
| 6,654,875 B1 | 11/2003 | Hartnett et al. |
| 6,807,616 B1 | 10/2004 | McGrath et al. |
| 6,871,273 B1 | 3/2005 | Moore |
| 6,877,084 B1 | 4/2005 | Christie |
| 6,880,152 B1 | 4/2005 | Torvalds et al. |
| 6,889,312 B1 | 5/2005 | McGrath et al. |
| 6,898,697 B1 | 5/2005 | Gao et al. |
| 6,981,131 B2 | 12/2005 | Devereux |
| 7,003,652 B2 | 2/2006 | Nevill et al. |
| 7,047,394 B1 | 5/2006 | Van Dyke et al. |
| 7,051,190 B2 | 5/2006 | Samra et al. |
| 7,143,271 B2 | 11/2006 | Huang et al. |
| 7,178,011 B2 | 2/2007 | Seal et al. |
| 7,219,215 B2 | 5/2007 | Ford et al. |
| 7,237,098 B2 | 6/2007 | Henry et al. |
| 7,243,213 B2 | 7/2007 | Pagni et al. |
| 7,260,815 B1 | 8/2007 | Chen et al. |
| 7,272,622 B2 | 9/2007 | Sebot et al. |
| 7,299,343 B2 | 11/2007 | Kalluri et al. |
| 7,353,368 B2 | 4/2008 | Chow et al. |
| 7,437,532 B1 | 10/2008 | Chen et al. |
| 7,478,388 B1 | 1/2009 | Chen et al. |
| 7,617,388 B2 | 11/2009 | Kissell |
| 7,624,256 B2 | 11/2009 | Sartorius et al. |
| 7,647,480 B2 | 1/2010 | Ford et al. |
| 7,873,814 B1 | 1/2011 | Cohen et al. |
| 7,925,868 B2 | 4/2011 | Lataille et al. |
| 8,090,931 B2 | 1/2012 | Col et al. |
| 8,479,176 B2 | 7/2013 | Ottoni et al. |
| 2001/0008563 A1 | 7/2001 | Yamaura et al. |
| 2001/0010072 A1 | 7/2001 | Yoshida |
| 2001/0032308 A1 | 10/2001 | Grochowski et al. |
| 2001/0044891 A1 | 11/2001 | McGrath et al. |
| 2002/0053013 A1 | 5/2002 | Sollars |
| 2002/0194458 A1 | 12/2002 | Soni |
| 2003/0018880 A1 | 1/2003 | Litaize et al. |
| 2003/0061471 A1 | 3/2003 | Matsuo |
| 2003/0188140 A1 | 10/2003 | Henry et al. |
| 2004/0034757 A1 | 2/2004 | Gochman et al. |
| 2004/0148496 A1 | 7/2004 | Thimmannagari et al. |
| 2004/0255103 A1 | 12/2004 | Duncan et al. |
| 2005/0081017 A1 | 4/2005 | Rupley, II et al. |
| 2005/0091474 A1 | 4/2005 | Wojewoda et al. |
| 2005/0125637 A1 | 6/2005 | Dijkstra et al. |
| 2005/0188185 A1 | 8/2005 | Grochowski |
| 2005/0216714 A1 | 9/2005 | Grochowski |
| 2006/0101247 A1 | 5/2006 | Callan et al. |
| 2006/0155974 A1 | 7/2006 | Moyer et al. |
| 2006/0179288 A1 | 8/2006 | Mellvaine et al. |
| 2006/0236078 A1 | 10/2006 | Sartorius et al. |
| 2007/0074010 A1 | 3/2007 | Nakajima |
| 2007/0208924 A1 | 9/2007 | Ford et al. |
| 2008/0046704 A1 | 2/2008 | Tanaka et al. |
| 2008/0065862 A1 | 3/2008 | Hansen et al. |
| 2008/0072011 A1 | 3/2008 | Kitamura |
| 2008/0189519 A1 | 8/2008 | Gschwind et al. |
| 2008/0216073 A1 | 9/2008 | Yates et al. |
| 2008/0256336 A1 | 10/2008 | Henry et al. |
| 2008/0276069 A1 | 11/2008 | Blaner et al. |
| 2008/0276072 A1 | 11/2008 | Rychlik |
| 2009/0006811 A1 | 1/2009 | Badran-Louca et al. |
| 2009/0031116 A1 | 1/2009 | Sudhakar et al. |
| 2009/0204785 A1 | 8/2009 | Yates, Jr. et al. |
| 2009/0204800 A1 | 8/2009 | Hooker et al. |
| 2009/0228691 A1 | 9/2009 | Furuta et al. |
| 2009/0300331 A1 | 12/2009 | Gschwind et al. |
| 2010/0070741 A1 | 3/2010 | Col et al. |
| 2010/0274988 A1 | 10/2010 | Mimar |
| 2010/0287359 A1 | 11/2010 | Norden |
| 2010/0299504 A1 | 11/2010 | Henry et al. |
| 2010/0332787 A1 | 12/2010 | Grohoski et al. |
| 2011/0035569 A1 | 2/2011 | Col et al. |
| 2011/0047357 A1 | 2/2011 | Stempel et al. |
| 2011/0225397 A1 | 9/2011 | Grisenthwaite et al. |
| 2012/0124346 A1 | 5/2012 | Hardage et al. |
| 2012/0260042 A1 | 10/2012 | Henry et al. |
| 2012/0260064 A1 | 10/2012 | Henry et al. |
| 2012/0260065 A1 | 10/2012 | Henry et al. |
| 2012/0260066 A1 | 10/2012 | Henry et al. |
| 2012/0260067 A1 | 10/2012 | Henry et al. |
| 2012/0260068 A1 | 10/2012 | Henry et al. |
| 2012/0260071 A1 | 10/2012 | Henry et al. |
| 2012/0260073 A1 | 10/2012 | Henry et al. |
| 2012/0260074 A1 | 10/2012 | Henry et al. |
| 2012/0260075 A1 | 10/2012 | Henry et al. |
| 2013/0067202 A1 | 3/2013 | Henry et al. |

(56) References Cited

U.S. PATENT DOCUMENTS

| | | |
|---|---|---|
| 2013/0097408 A1 | 4/2013 | Seal et al. |
| 2013/0305013 A1 | 11/2013 | Ebersole |
| 2013/0305014 A1 | 11/2013 | Ebersole |

FOREIGN PATENT DOCUMENTS

| | | |
|---|---|---|
| EP | 0747808 | 12/1996 |
| EP | 1050803 | 11/2000 |
| EP | 1447742 | 8/2004 |
| TW | 200912741 A | 3/2009 |
| WO | WO96/24895 A | 8/1996 |
| WO | WO0106354 A1 | 1/2001 |
| WO | WO02097612 A1 | 12/2002 |
| WO | WO2012138950 A2 | 10/2012 |
| WO | WO2012138952 A1 | 10/2012 |
| WO | WO2012138957 A1 | 10/2012 |

OTHER PUBLICATIONS

Buchty, Rainer et al. "High-Performance and Hardware-aware Computing." Proceedings of the First International Workshop on New Frontiers in High-performance and Hardware-aware Computing (HipHac'08). Lake Como, Italy, Nov. 2008. pp. 1-8.

"System/360, Model 30, 1401 Compatibility Feature." IBM Systems Reference Library. File No. S360-13, Form A24-3255-1. Revised Apr. 1964. pp. 5-12.

McCormack, M.A. et al. "1401 Compatibility Feature on the IBM System/360 Model 30." IBM Corporation, Endicott, New York. Downloaded May 11, 2011 from http://www.ibm-1401.info/ACM1401Sim.html. pp. 1-8.

Silberman, Gabriel M. et al. "An Architectural Framework for Supporting Heterogeneous Instruction-Set Architectures." IBM T.J. Watson Research Center. 8153 Computer, Jun. 26, 1993. No. 6 IEEE. XP000377627 pp. 39-56.

"Instruction Set Architectures." ARM The Architecture for the Digital World. Downloaded on Feb. 21, 2011 from http://www.arm.com/products/processors/technologies/instruction-set-architectures.php. pp. 1-2.

Bellard, Fabrice. "QEMU, a Fast and Portable Dynamic Translator." USENIX Association. FREENIX Track: 2005 USENIX Annual Technical Conference. pp. 41-46.

"Binary Translation" Wikipedia, the free encyclopedia. Downloaded on May 5, 2011 from http://en.wikipedia.org/wiki/Binary_translation. pp. 1-4.

Nakada, Takashi et al. "OROCHI: A Multiple Instruction Set SMT Processor." Taken from High-performance and Harware-aware Computing; Proceedings of the First International Workshop on New Frontiers in High-performance and Hareware-aware Computing (HipHaC'08) Nov. 2008. pp. 13-20.

Shimada, Hajime et al. "Outline of OROCHI: A Multiple Instruction Set Executable SMT Processor." Downloaded on May 5, 2011 from http://arch.naist.jp/~shimada/pub/iwia07.pdf. pp. 1-8.

"Jazelle" Wikipedia, the free encyclopedia. Downloaded on May 30, 2011 from http://en.wikipedia.org/wiki/Jazelle. pp. 1-5.

"Concurrency (2): Advanced Operating Systems (M) Lecture 17" School of Computing Science, University of Glasgow. Downloaded on May 5, 2011 from http://csperkins.org/teaching/adv-os/Lecture17-concurrency.pdf. pp. 1-15.

"Machine Code" Wikipedia, the free encyclopedia. Downloaded on May 23, 2011 from http;//en.wikipedia.org/wiki/Machine_code. pp. 1-4.

Chen, Jiunn-Yeu et al. "On Static Binary Translation and Optimization for ARM Based Applications." Downloaded on Aug. 26, 2011 from http://www.cs.princeton.edu/~thhung/pubs/odes08.pdf pp. 1-10.

Ebcioglu, Kemal et al. "DAISY: Dynamic Compilation for 100% Architectural Compatibility." IBM Research Report. RC 20538 Computer Science Aug. 5, 1996. pp. 1-84.

"Texas Instruments OMAP" Wikipedia, the free encyclopedia. Downloaded on May 16, 2011 from http://en.wikipedia.org/wiki/Texas_Instruments_OMAP. pp. 1-4.

"Transmeta" Wikipedia, the free encyclopedia. Downloaded on May 12, 2011 from http://en.wikipedia.org/wiki/Transmeta. pp. 1-8.

Wang Hao, Lee. "ARM Instruction Set Simulation on Multi-Core x86 Hardware." School of Computer Science, The University of Adelaide. Jun. 19, 2009. pp. 1-70 Downloaded on May 5, 2011 from http://cs.adelaide.edu.au/~brad/students/wanghao.pdf.

Gochman, Simcha et al. "The Intel® Pentium® M Processor: Microarchitecture and Performance." Intel® Technology Journal. vol. 7 Issue 02 Published May 21, 2003. ISSN 1535-864X pp. 21-36.

Osdata.com "Assembly Language: address space and addressing modes." Downloaded from http://www.osdata.com/topic/language/asm/address.htm. Downloaded Dec. 7, 2009. pp. 1-11.

Tendler, J.M. et al. "Power4 System Microarchitecture." IBM J. Res. & Dev. vol. 46 No. 1, Jan. 2002. pp. 5-25.

Intel® "Intel® Itanium® Architecture Software Deverloper's Manual." vol. 2: System Architecture. Revision 2.1 Document # 245318-004. Oct. 2002. pp. 2:35, 2.86 and pp. 2:115 thru 2:130.

Gwennap, Linley "Intel's P6 Uses Decoupled Superscalar Design: Next Generation of x86 Integrates L2 Cache in Package with CPU." Microprocessor Report, vol. 9, No. 2, pp. 1-7. Feb. 1995.

Intel®, "IA-32 Intel® Architecture Software Developer's Manual." vol. 2A: Instruction Set Reference, A-M. Sep. 2005, p. 3-112 to 3-117.

Quinones, Eduardo et al., "Selective Predicate Prediction for Out-of-Order Processors." Jun. 28-30, 2006. Proceedings of the 20th Annual International Conference on Supercomputing, pp. 46-54.

Chuang, Weihaw, et al. "Predicate Prediction for Efficient Out-of-Order Execution." Jun. 23-26, 2003, Proceedings of the 17th Annual International Conference on Supercomputing. pp. 183-192.

ARM Limited, "ARM Architecture Reference Manual v7-A and v7-R Edition." 2008, pp. A4-22, B1-6 to B1-10.

ARM Limited, "ARM Architecture Reference Manual v7-A and v7-R Edition." 2008, pp. A1-3 to A1-6, A2-11, A2-21, A2-22, B1-9, B2-3, B2-4, B4-45 to B4-50.

Intel®, "IA-32 Intel® Architecture Software Developer's Manual." vol. 1, Sep. 2005, pp. 3-24, 3-28, vol. 3 pp. 2-16 to 2-23, 9-2 to 9-5, 10-1 to 10-4.

Sanchez et al. "Thermal Management System for High Performance PowerPC™ Microprocessors." Compcon '97, Proceedings, IEEE, Feb. 1997, pp. 325-330.

FIG. 11

```
MRRC_ENTRY_POINT:
    DETERMINE COPROCESSOR == 4;
    DETERMINE REGISTER ADDRESS == (0, 7, 15, 0);
    VERIFY NOT IN USER MODE;
    VERIFY MSR-ACCESS-FROM-ARM FEATURE ENABLED;
    COPY VALUE IN R1 TO TEMP1;
    CALL RDMSR_COMMON;
    COPY VALUE IN TEMP2 TO R2:R0;
    RETURN FROM MICROCODE;
...

RDMSR_ENTRY_POINT:
    COPY VALUE IN ECX TO TEMP1;
    CALL RDMSR_COMMON;
    COPY VALUE IN TEMP2 TO EDX:EAX;
    RETURN FROM MICROCODE;
...

RDMSR_COMMON:
        // LOAD INTO TEMP2 THE VALUE IN THE MSR WHOSE ADDRESS IS SPECIFIED IN TEMP1;
        RETURN;

...

MCRR_ENTRY_POINT:
    DETERMINE COPROCESSOR == 4;
    DETERMINE REGISTER ADDRESS == (0, 7, 15, 0);
    VERIFY NOT IN USER MODE;
    VERIFY MSR-ACCESS-FROM-ARM FEATURE ENABLED;
    COPY VALUE IN R1 TO TEMP1;
    COPY VALUE IN R2:R0 TO TEMP2;
    CALL WRMSR_COMMON;
    RETURN FROM MICROCODE;
...

WRMSR_ENTRY_POINT:
    COPY VALUE IN ECX TO TEMP1;
    COPY VALUE IN EDX:EAX TO TEMP2 ;
    CALL WRMSR_COMMON;
    RETURN FROM MICROCODE;
...

WRMSR_COMMON:
        // LOAD THE VALUE IN TEMP2 INTO THE MSR WHOSE ADDRESS IS SPECIFIED IN TEMP1;
        RETURN;
```

MICROCODE 234

ACCESSING MODEL SPECIFIC REGISTERS (MSR) WITH DIFFERENT SETS OF DISTINCT MICROINSTRUCTIONS FOR INSTRUCTIONS OF DIFFERENT INSTRUCTION SET ARCHITECTURE (ISA)

CROSS REFERENCE TO RELATED APPLICATION

This application is a continuation-in-part (CIP) of U.S. Non-Provisional Patent Applications

| | |
|---|---|
| 13/224,310 (CNTR.2575) | Sep. 1, 2011 |
| 13/333,520 (CNTR.2569) | Dec. 21, 2011 |
| 13/333,572 (CNTR.2572) | Dec. 21, 2011 |
| 13/333,631 (CNTR.2618) | Dec. 21, 2011 | each of which is hereby incorporated by reference in its entirety for all purposes;

This application claims priority based on U.S. Provisional Applications

| | |
|---|---|
| 61/473,062 (CNTR.2547) | Apr. 7, 2011 |
| 61/473,067 (CNTR.2552) | Apr. 7, 2011 |
| 61/473,069 (CNTR.2556) | Apr. 7, 2011 |
| 61/537,473 (CNTR.2569) | Sep. 21, 2011 |
| 61/541,307 (CNTR.2585) | Sep. 30, 2011 |
| 61/547,449 (CNTR.2573) | Oct. 14, 2011 |
| 61/555,023 (CNTR.2564) | Nov. 3, 2011 |
| 61/604,561 (CNTR.2552) | Feb. 29, 2012 | each of which is incorporated by reference herein in its entirety for all purposes;

U.S. Non-Provisional Patent Application

| | |
|---|---|
| 13/224,310 (CNTR.2575) | Sep. 1, 2011 | claims priority to U.S. Provisional Patent Applications

| | |
|---|---|
| 61/473,062 (CNTR.2547) | Apr. 7, 2011 |
| 61/473,067 (CNTR.2552) | Apr. 7, 2011 |
| 61/473,069 (CNTR.2556) | Apr. 7, 2011 |

Each of U.S. Non-Provisional Applications

| | |
|---|---|
| 13/333,520 (CNTR.2569) | Dec. 21, 2011 |
| 13/333,572 (CNTR.2572) | Dec. 21, 2011 |
| 13/333,631 (CNTR.2618) | Dec. 21, 2011 | is a continuation-in-part (CIF) of U.S. Non-Provisional Patent Application

| | |
|---|---|
| 13/224,310 (CNTR.2575) | Sep. 1, 2011 | and claims priority based on U.S. Provisional Patent Applications

| | |
|---|---|
| 61/473,062 (CNTR.2547) | Apr. 7, 2011 |
| 61/473,067 (CNTR.2552) | Apr. 7, 2011 |
| 61/473,069 (CNTR.2556) | Apr. 7, 2011 |
| 61/537,473 (CNTR.2569) | Sep. 21, 2011 |

This application is related to U.S. Non-Provisional Applications

| | |
|---|---|
| 13/413,258 (CNTR.2552) | Mar. 6, 2012 |
| 13/412,888 (CNTR.2580) | Mar. 6, 2012 |
| 13/412,904 (CNTR.2583) | Mar. 6, 2012 |
| 13/412,914 (CNTR.2585) | Mar. 6, 2012 |
| 13/413,300 (CNTR.2564) | Mar. 6, 2012 |
| 13/413,314 (CNTR.2568) | Mar. 6, 2012 |

FIELD OF THE INVENTION

The present invention relates in general to the field of microprocessors, and particularly to support of multiple instruction set architectures thereon.

BACKGROUND OF THE INVENTION

The x86 processor architecture, originally developed by Intel Corporation of Santa Clara, Calif., and the Advanced RISC Machines (ARM) architecture, originally developed by ARM Ltd. of Cambridge, UK, are well known in the art of computing. Many computing systems exist that include an ARM or x86 processor, and the demand for them appears to be increasing rapidly. Presently, the demand for ARM architecture processing cores appears to dominate low power, low cost segments of the computing market, such as cell phones, PDA's, tablet PCs, network routers and hubs, and set-top boxes (for example, the main processing power of the Apple iPhone and iPad is supplied by an ARM architecture processor core), while the demand for x86 architecture processors appears to dominate market segments that require higher performance that justifies higher cost, such as in laptops, desktops and servers. However, as the performance of ARM cores increases and the power consumption and cost of certain models of x86 processors decreases, the line between the different markets is evidently fading, and the two architectures are beginning to compete head-to-head, for example in mobile computing markets such as smart cellular phones, and it is likely they will begin to compete more frequently in the laptop, desktop and server markets.

This situation may leave computing device manufacturers and consumers in a dilemma over which of the two architectures will predominate and, more specifically, for which of the two architectures software developers will develop more software. For example, some entities purchase very large amounts of computing systems each month or year. These entities are highly motivated to buy systems that are the same configuration due to the cost efficiencies associated with purchasing large quantities of the same system and the simplification of system maintenance and repair, for example. However, the user population of these large entities may have diverse computing needs for these single configuration systems. More specifically, some of the users have computing needs in which they want to run software on an ARM architecture processor, and some have computing needs in which they want to run software on an x86 architecture processor, and some may even want to run software on both. Still further, new previously-unanticipated computing needs may emerge that demand one architecture or the other. In these situations, a portion of the extremely large investment made by these large entities may have been wasted. For another example, a given user may have a crucial application that only runs on the x86 architecture so he purchases an x86 architecture system, but a version of the application is subsequently developed for the ARM architecture that is superior to the x86 version (or vice versa) and therefore the user would like to switch. Unfortunately, he has already made the investment in the architecture that he does not prefer. Still further, a given user may have invested in applications that only run on the ARM architecture, but the user would also like to take advantage of fact that applications in other areas have been developed for the x86 architecture that do not exist for the ARM architecture or that are superior to comparable software developed for the ARM architecture, or vice versa. It should be noted that although the investment made by a small entity or an individual user may not be as great as by the large entity in terms of magnitude, nevertheless in relative terms the investment wasted may be even larger. Many other similar examples of wasted investment may exist or arise in the context of a switch in dominance from the x86 architecture to the ARM architecture, or vice versa, in various computing device markets. Finally, computing device manufacturers, such as OEMs, invest large amounts of resources into developing new products. They are caught in the dilemma also and may waste some of their valuable development resources if they develop and manufacture mass quantities of a system around the x86 or ARM architecture and then the user demand changes relatively suddenly.

It would be beneficial for manufacturers and consumers of computing devices to be able to preserve their investment regardless of which of the two architectures prevails. Therefore, what is needed is a solution that would allow system manufacturers to develop computing devices that enable users to run both x86 architecture and ARM architecture programs.

The desire to have a system that is capable of running programs of more than one instruction set has long existed, primarily because customers may make a significant investment in software that runs on old hardware whose instruction set is different from that of the new hardware. For example, the IBM System/360 Model 30 included an IBM System 1401 compatibility feature to ease the pain of conversion to the higher performance and feature-enhanced System/360. The Model 30 included both a System/360 and a 1401 Read Only Storage (ROS) Control, which gave it the capability of being used in 1401 mode if the Auxiliary Storage was loaded with needed information beforehand. Furthermore, where the software was developed in a high-level language, the new hardware developer may have little or no control over the software compiled for the old hardware, and the software developer may not have a motivation to re-compile the source code for the new hardware, particularly if the software developer and the hardware developer are not the same entity. Silberman and Ebcioglu proposed techniques for improving performance of existing ("base") CISC architecture (e.g., IBM S/390) software by running it on RISC, superscalar, and Very Long Instruction Word (VLIW) architecture ("native") systems by including a native engine that executes native code and a migrant engine that executes base object code, with the ability to switch between the code types as necessary depending upon the effectiveness of translation software that translates the base object code into native code. See "An Architectural Framework for Supporting Heterogeneous Instruction-Set Architectures," Siberman and Ebcioglu, Computer, June 1993, No. 6. Van Dyke et al. disclosed a processor having an execution pipeline that executes native RISC (Tapestry) program instructions and which also translates x86 program instructions into the native RISC instructions through a combination of hardware translation and software translation, in U.S. Pat. No. 7,047,394, issued May 16, 2006. Nakada et al. proposed a heterogeneous SMT processor with an Advanced RISC Machines (ARM) architecture front-end pipeline for irregular (e.g., OS) programs and a Fujitsu FR-V (VLIW) architecture front-end pipeline for multimedia applications that feed an FR-V VLIW back-end pipeline with an added VLIW queue to hold instructions from the front-end pipelines. See "OROCHI: A Multiple Instruction Set SMT Processor," Proceedings of the First International Workshop on New Frontiers in High-performance and Hardware-aware Computing (HipHaC'08), Lake Como, Italy, November 2008 (In conjunction with MICRO-41), Buchty and Weib, eds, Universitatsverlag Karlsruhe, ISBN 978-3-86644-298-6. This approach was proposed in order to reduce the total system footprint over heterogeneous System on Chip (SOC) devices, such as the Texas Instruments OMAP that includes an ARM processor core plus one or more co-processors (such as the TMS320, various digital signal processors, or various GPUs) that do not share instruction execution resources but are instead essentially distinct processing cores integrated onto a single chip.

Software translators, also referred to as software emulators, software simulators, dynamic binary translators and the like, have also been employed to support the ability to run programs of one architecture on a processor of a different architecture. A popular commercial example is the Motorola 68K-to-PowerPC emulator that accompanied Apple Macintosh computers to permit 68K programs to run on a Macintosh with a PowerPC processor, and a PowerPC-to-x86 emulator was later developed to permit PowerPC programs to run on a Macintosh with an x86 processor. Transmeta Corporation of Santa Clara, Calif., coupled VLIW core hardware and "a pure software-based instruction translator [referred to as "Code Morphing Software"] [that] dynamically compiles or emulates x86 code sequences" to execute x86 code. "Transmeta." *Wikipedia.* 2011. Wikimedia Foundation, Inc. <http://en.wikipedia.org/wiki/Transmeta>. See also, for example, U.S. Pat. No. 5,832,205, issued Nov. 3, 1998 to Kelly et al. The IBM DAISY (Dynamically Architected Instruction Set from Yorktown) system includes a VLIW machine and dynamic binary software translation to provide 100% software compatible emulation of old architectures. DAISY includes a Virtual Machine Monitor residing in ROM that parallelizes and saves the VLIW primitives to a portion of main memory not visible to the old architecture in hopes of avoiding re-translation on subsequent instances of the same old architecture code fragments. DAISY includes fast compiler optimization algorithms to increase performance. QEMU is a machine emulator that includes a software dynamic translator. QEMU emulates a number of CPUs (e.g., x86, PowerPC, ARM and SPARC) on various hosts (e.g., x86, PowerPC, ARM, SPARC, Alpha and MIPS). As stated by its originator, the "dynamic translator performs a runtime conversion of the target CPU instructions into the host instruction set. The resulting binary code is stored in a translation cache so that it can be reused . . . . QEMU is much simpler [than other dynamic translators] because it just concatenates pieces of machine code generated off line by the GNU C Compiler." QEMU, a Fast and Portable Dynamic Translator, Fabrice Bellard, USENIX Association, FREENIX Track: 2005 USENIX Annual Technical Conference. See also, "ARM Instruction Set Simulation on Multi-Core x86 Hardware," Lee Wang Hao, thesis, University of Adelaide, Jun. 19, 2009. However, while software translator-based solutions may provide sufficient performance for a subset of computing needs, they are unlikely to provide the performance required by many users.

Static binary translation is another technique that has the potential for high performance. However, there are technical considerations (e.g., self-modifying code, indirect branches whose value is known only at run-time) and commercial/legal barriers (e.g., may require the hardware developer to develop channels for distribution of the new programs; potential license or copyright violations with the original program distributors) associated with static binary translation.

BRIEF SUMMARY OF INVENTION

In one aspect, the present invention provides a microprocessor capable of running both x86 instruction set architecture (ISA) machine language programs and Advanced RISC Machines (ARM) ISA machine language programs. The microprocessor includes a mode indicator that indicates whether the microprocessor is currently fetching instructions of an x86 ISA or ARM ISA machine language program. The microprocessor also includes a plurality of model-specific registers (MSRs) that control aspects of the operation of the microprocessor. When the mode indicator indicates the microprocessor is currently fetching x86 ISA machine language program instructions, each of the plurality of MSRs is accessible via an x86 ISA RDMSR/WRMSR instruction that specifies an address of the MSR. When the mode indicator indicates the microprocessor is currently fetching ARM ISA machine language program instructions, each of the plurality of MSRs is accessible via an ARM ISA MRRC/MCRR instruction that specifies the address of the MSR.

In another aspect, the present invention provides a method for accessing a plurality of model-specific registers (MSRs) that control aspects of the operation of a microprocessor capable of running both x86 instruction set architecture (ISA) machine language programs and Advanced RISC Machines (ARM) ISA machine language programs, the microprocessor having a mode indicator the indicates whether the microprocessor is currently fetching instructions of an x86 ISA or ARM ISA machine language program. The method includes accessing one of the plurality of MSRs via an x86 ISA RDMSR/WRMSR instruction that specifies an address of the MSR when the mode indicator indicates the microprocessor is currently fetching x86 ISA machine language program instructions. The method also includes accessing the one of the plurality of MSRs via an ARM ISA MRRC/MCRR instruction that specifies the address of the MSR when the mode indicator indicates the microprocessor is currently fetching ARM ISA machine language program instructions.

In yet another aspect, the present invention provides a computer program product encoded in at least one computer readable storage medium for use with a computing device, the computer program product comprising computer readable program code embodied in the medium for specifying a microprocessor capable of running both x86 instruction set architecture (ISA) machine language programs and Advanced RISC Machines (ARM) ISA machine language programs. The computer readable program code includes first program code for specifying a mode indicator that indicates whether the microprocessor is currently fetching instructions of an x86 ISA or ARM ISA machine language program. The computer readable program code includes second program code for specifying a plurality of model-specific registers (MSRs) that control aspects of the operation of the microprocessor. When the mode indicator indicates the microprocessor is currently fetching x86 ISA machine language program instructions, each of the plurality of MSRs is accessible via an x86 ISA RDMSR/WRMSR instruction that specifies an address of the MSR. When the mode indicator indicates the microprocessor is currently fetching ARM ISA machine language program instructions, each of the plurality of MSRs is accessible via an ARM ISA MRRC/MCRR instruction that specifies the address of the MSR.

BRIEF DESCRIPTION OF THE DRAWINGS

FIG. 11 is pseudocode of microcode that handles the instructions that access the MSRs.

DETAILED DESCRIPTION OF THE INVENTION

Glossary

Figure 1:
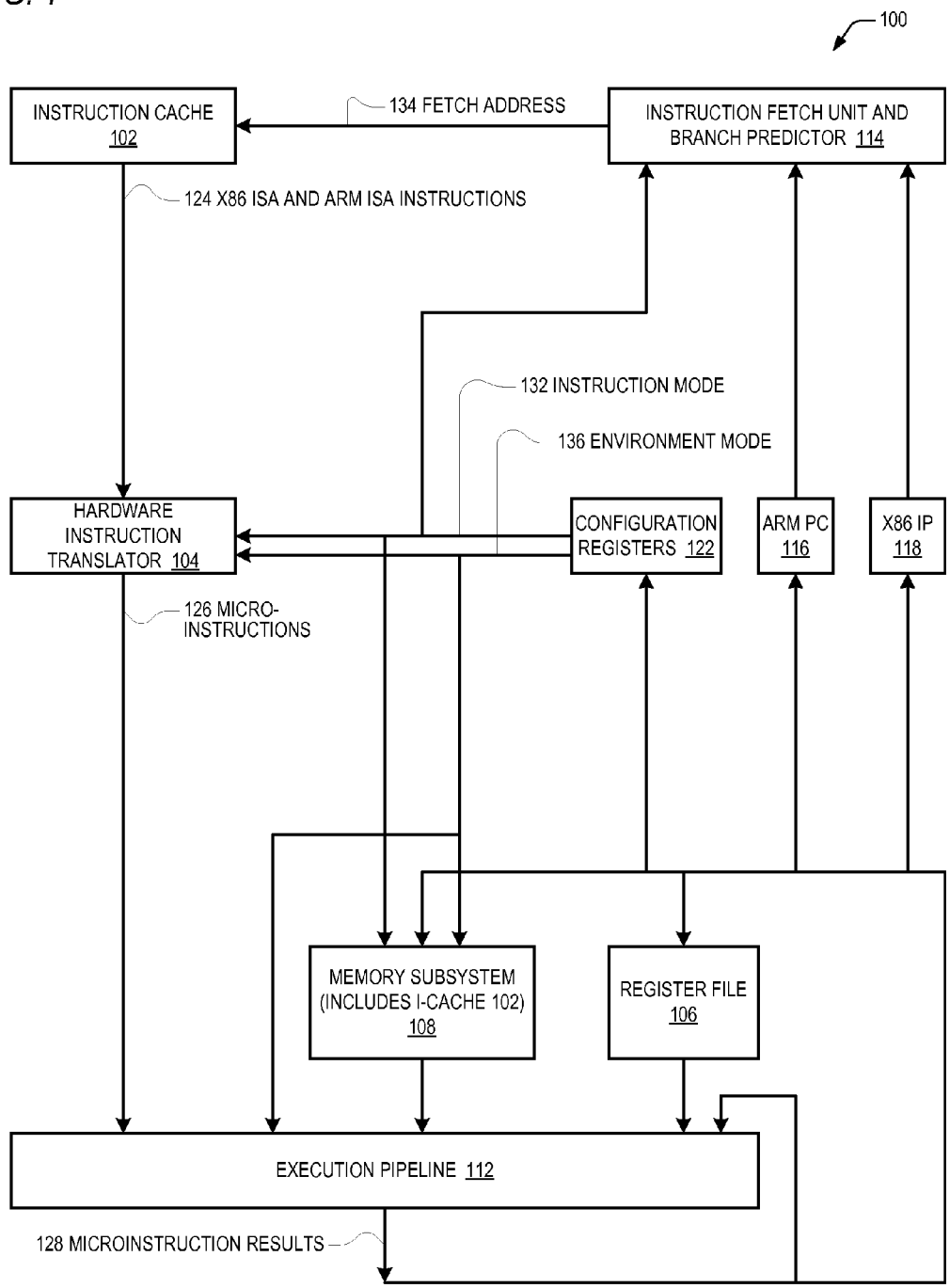
FIG. 1 is a block diagram illustrating a microprocessor that runs x86 ISA and ARM ISA machine language programs according to the present invention.

An instruction set defines the mapping of a set of binary encoded values, which are machine language instructions, to operations the microprocessor performs. (Typically, machine language programs are encoded in binary, although other number systems may be employed, for example, the machine language programs of some older IBM computers were encoded in decimal although they were ultimately represented by collections of physical signals having voltages sensed as binary values.) Illustrative examples of the types of operations machine language instructions may instruct a microprocessor to perform are: add the operand in register 1 to the operand in register 2 and write the result to register 3, subtract the immediate operand specified in the instruction from the operand in memory location 0x12345678 and write the result to register 5, shift the value in register 6 by the number of bits specified in register 7, branch to the instruction 36 bytes after this instruction if the zero flag is set, load the value from memory location 0xABCD0000 into register 8. Thus, the instruction set defines the binary encoded value each machine language instruction must have to cause the microprocessor to perform the desired operation. It should be understood that the fact that the instruction set defines the mapping of binary values to microprocessor operations does not imply that a single binary value maps to a single microprocessor operation. More specifically, in some instruction sets, multiple binary values may map to the same microprocessor operation.

An instruction set architecture (ISA), in the context of a family of microprocessors, comprises: (1) an instruction set, (2) a set of resources (e.g., registers and modes for addressing memory) accessible by the instructions of the instruction set, and (3) a set of exceptions the microprocessor generates in response to processing the instructions of the instruction set (e.g., divide by zero, page fault, memory protection violation). Because a programmer, such as an assembler or compiler writer, who wants to generate a machine language program to run on a microprocessor family requires a definition of its ISA, the manufacturer of the microprocessor family typically defines the ISA in a programmer's manual. For example, at the time of its publication, the Intel 64 and IA-32 Architectures Software Developer's Manual, March 2009 (consisting of five volumes, namely Volume 1: Basic Architecture; Volume 2A: Instruction Set Reference, A-M; Volume 2B: Instruction Set Reference, N-Z; Volume 3A: System Programming Guide; and Volume 3B: System Programming Guide, Part 2), which is hereby incorporated by reference herein in its entirety for all purposes, defined the ISA of the Intel 64 and IA-32 processor architecture, which is commonly referred to as the x86 architecture and which is also referred to herein as x86, x86 ISA, x86 ISA family, x86 family or similar terms. For another example, at the time of its publication, the ARM Architecture Reference Manual, ARM v7-A and ARM v7-R edition Errata markup, 2010, which is hereby incorporated by reference herein in its entirety for all purposes, defined the ISA of the ARM processor architecture, which is also referred to herein as ARM, ARM ISA, ARM ISA family, ARM family or similar terms. Other examples of well-known ISA families are IBM System/360/370/390 and z/Architecture, DEC VAX, Motorola 68k, MIPS, SPARC, PowerPC, and DEC Alpha. The ISA definition covers a family of processors because over the life of the ISA processor family the manufacturer may enhance the ISA of the original processor in the family by, for example, adding new instructions to the instruction set and/or new registers to the architectural register set. To clarify by example, as the x86 ISA evolved it introduced in the Intel Pentium III processor family a set of 128-bit XMM registers as part of the SSE extensions, and x86 ISA machine language programs have been developed to utilize the XMM registers to increase performance, although x86 ISA machine language programs exist that do not utilize the XMM registers of the SSE extensions. Furthermore, other manufacturers have designed and manufactured microprocessors that run x86 ISA machine language programs. For example, Advanced Micro Devices (AMD) and VIA Technologies have added new features, such as the AMD 3DNOW! SIMD vector processing instructions and the VIA Padlock Security Engine random number generator and advanced cryptography engine features, each of which are utilized by some x86 ISA machine language programs but which are not implemented in current Intel microprocessors. To clarify by another example, the ARM ISA originally defined the ARM instruction set state, having 4-byte instructions. However, the ARM ISA evolved to add, for example, the Thumb instruction set state with 2-byte instructions to increase code density and the Jazelle instruction set state to accelerate Java bytecode programs, and ARM ISA machine language programs have been developed to utilize some or all of the other ARM ISA instruction set states, although ARM ISA machine language programs exist that do not utilize the other ARM ISA instruction set states.

A machine language program of an ISA comprises a sequence of instructions of the ISA, i.e., a sequence of binary encoded values that the ISA instruction set maps to the sequence of operations the programmer desires the program to perform. Thus, an x86 ISA machine language program comprises a sequence of x86 ISA instructions; and an ARM ISA machine language program comprises a sequence of ARM ISA instructions. The machine language program instructions reside in memory and are fetched and performed by the microprocessor.

A hardware instruction translator comprises an arrangement of transistors that receives an ISA machine language instruction (e.g., an x86 ISA or ARM ISA machine language instruction) as input and responsively outputs one or more microinstructions directly to an execution pipeline of the microprocessor. The results of the execution of the one or more microinstructions by the execution pipeline are the results defined by the ISA instruction. Thus, the collective execution of the one or more microinstructions by the execution pipeline "implements" the ISA instruction; that is, the collective execution by the execution pipeline of the implementing microinstructions output by the hardware instruction translator performs the operation specified by the ISA instruction on inputs specified by the ISA instruction to produce a result defined by the ISA instruction. Thus, the hardware instruction translator is said to "translate" the ISA instruction into the one or more implementing microinstructions. The present disclosure describes embodiments of a microprocessor that includes a hardware instruction translator that translates x86 ISA instructions and ARM ISA instructions into microinstructions. It should be understood that the hardware instruction translator is not necessarily capable of translating the entire set of instructions defined by the x86 programmer's manual nor the ARM programmer's manual but rather is capable of translating a subset of those instructions, just as the vast majority of x86 ISA and ARM ISA processors support only a subset of the instructions defined by their respective programmer's manuals. More specifically, the subset of instructions defined by the x86 programmer's manual that the hardware instruction translator translates does not necessarily correspond to any existing x86 ISA processor, and the subset of instructions defined by the ARM programmer's manual that the hardware instruction translator translates does not necessarily correspond to any existing ARM ISA processor.

An execution pipeline is a sequence of stages in which each stage includes hardware logic and a hardware register for holding the output of the hardware logic for provision to the next stage in the sequence based on a clock signal of the microprocessor. The execution pipeline may include multiple such sequences of stages, i.e., multiple pipelines. The execution pipeline receives as input microinstructions and responsively performs the operations specified by the microinstructions to output results. The hardware logic of the various pipelines performs the operations specified by the microinstructions that may include, but are not limited to, arithmetic, logical, memory load/store, compare, test, and branch resolution, and performs the operations on data in formats that may include, but are not limited to, integer, floating point, character, BCD, and packed. The execution pipeline executes the microinstructions that implement an ISA instruction (e.g., x86 and ARM) to generate the result defined by the ISA instruction. The execution pipeline is distinct from the hardware instruction translator; more specifically, the hardware instruction translator generates the implementing microinstructions and the execution pipeline executes them; furthermore, the execution pipeline does not generate the implementing microinstructions.

An instruction cache is a random access memory device within a microprocessor into which the microprocessor places instructions of an ISA machine language program (such as x86 ISA and ARM ISA machine language instructions) that were recently fetched from system memory and performed by the microprocessor in the course of running the ISA machine language program. More specifically, the ISA defines an instruction address register that holds the memory address of the next ISA instruction to be performed (defined by the x86 ISA as an instruction pointer (IP) and by the ARM ISA as a program counter (PC), for example), and the microprocessor updates the instruction address register contents as it runs the machine language program to control the flow of the program. The ISA instructions are cached for the purpose of subsequently fetching, based on the instruction address register contents, the ISA instructions more quickly from the instruction cache rather than from system memory the next time the flow of the machine language program is such that the register holds the memory address of an ISA instruction present in the instruction cache. In particular, an instruction cache is accessed based on the memory address held in the instruction address register (e.g., IP or PC), rather than exclusively based on a memory address specified by a load or store instruction. Thus, a dedicated data cache that holds ISA instructions as data—such as may be present in the hardware portion of a system that employs a software translator—that is accessed exclusively based on a load/store address but not by an instruction address register value is not an instruction cache. Furthermore, a unified cache that caches both instructions and data, i.e., that is accessed based on an instruction address register value and on a load/store address, but not exclusively based on a load/store address, is intended to be included in the definition of an instruction cache for purposes of the present disclosure. In this context, a load instruction is an instruction that reads data from memory into the microprocessor, and a store instruction is an instruction that writes data to memory from the microprocessor.

A microinstruction set is the set of instructions (microinstructions) the execution pipeline of the microprocessor can execute.

Description of the Embodiments

The present disclosure describes embodiments of a microprocessor that is capable of running both x86 ISA and ARM ISA machine language programs by hardware translating their respective x86 ISA and ARM ISA instructions into microinstructions that are directly executed by an execution pipeline of the microprocessor. The microinstructions are defined by a microinstruction set of the microarchitecture of the microprocessor distinct from both the x86 ISA and the ARM ISA. As the microprocessor embodiments described herein run x86 and ARM machine language programs, a hardware instruction translator of the microprocessor translates the x86 and ARM instructions into the microinstructions and provides them to the execution pipeline of the microprocessor that executes the microinstructions that implement the x86 and ARM instructions. Advantageously, the microprocessor potentially runs the x86 and ARM machine language programs faster than a system that employs a software translator since the implementing microinstructions are directly provided by the hardware instruction translator to the execution pipeline for execution, unlike a software translator-based system that stores the host instructions to memory before they can be executed by the execution pipeline.

Referring now to FIG. 1, a block diagram illustrating a microprocessor 100 that can run x86 ISA and ARM ISA machine language programs according to the present invention is shown. The microprocessor 100 includes an instruction cache 102; a hardware instruction translator 104 that receives x86 ISA instructions and ARM ISA instructions 124 from the instruction cache 102 and translates them into microinstructions 126; an execution pipeline 112 that receives the implementing microinstructions 126 from the hardware instruction translator 104 executes them to generate microinstruction results 128 that are forwarded back as operands to the execution pipeline 112; a register file 106 and a memory subsystem 108 that each provide operands to the execution pipeline 112 and receive the microinstruction results 128 therefrom; an instruction fetch unit and branch predictor 114 that provides a fetch address 134 to the instruction cache 102; an ARM ISA-defined program counter (PC) register 116 and an x86 ISA-defined instruction pointer (IP) register 118 that are updated by the microinstruction results 128 and whose contents are provided to the instruction fetch unit and branch predictor 114; and configuration registers 122 that provide an instruction mode indicator 132 and an environment mode indicator 136 to the hardware instruction translator 104 and the instruction fetch unit and branch predictor 114 and that are updated by the microinstruction results 128.

As the microprocessor 100 performs x86 ISA and ARM ISA machine language instructions, it fetches the instructions from system memory (not shown) into the microprocessor 100 according to the flow of the program. The microprocessor 100 caches the most recently fetched x86 ISA and ARM ISA machine language instructions in the instruction cache 102. The instruction fetch unit 114 generates a fetch address 134 from which to fetch a block of x86 ISA or ARM ISA instruction bytes from system memory. The instruction cache 102 provides to the hardware instruction translator 104 the block of x86 ISA or ARM ISA instruction bytes 124 at the fetch address 134 if it hits in the instruction cache 102; otherwise, the ISA instructions 124 are fetched from system memory. The instruction fetch unit 114 generates the fetch address 134 based on the values in the ARM PC 116 and x86 IP 118. More specifically, the instruction fetch unit 114 maintains a fetch address in a fetch address register. Each time the instruction fetch unit 114 fetches a new block of ISA instruction bytes, it updates the fetch address by the size of the block and continues sequentially in this fashion until a control flow event occurs. The control flow events include the generation of an exception, the prediction by the branch predictor 114 that a taken branch was present in the fetched block, and an update by the execution pipeline 112 to the ARM PC 116 and x86 IP 118 in response to a taken executed branch instruction that was not predicted taken by the branch predictor 114. In response to a control flow event, the instruction fetch unit 114 updates the fetch address to the exception handler address, predicted target address, or executed target address, respectively. An embodiment is contemplated in which the instruction cache 102 is a unified cache in that it caches both ISA instructions 124 and data. It is noted that in the unified cache embodiments, although the unified cache may be accessed based on a load/store address to read/write data, when the microprocessor 100 fetches ISA instructions 124 from the unified cache, the unified cache is accessed based on the ARM PC 116 and x86 IP 118 values rather than a load/store address. The instruction cache 102 is a random access memory (RAM) device.

The instruction mode indicator 132 is state that indicates whether the microprocessor 100 is currently fetching, formatting/decoding, and translating x86 ISA or ARM ISA instructions 124 into microinstructions 126. Additionally, the execution pipeline 112 and memory subsystem 108 receive the instruction mode indicator 132 which affects the manner of executing the implementing microinstructions 126, albeit for a relatively small subset of the microinstruction set. The x86 IP register 118 holds the memory address of the next x86 ISA instruction 124 to be performed, and the ARM PC register 116 holds the memory address of the next ARM ISA instruction 124 to be performed. To control the flow of the program, the microprocessor 100 updates the x86 IP register 118 and ARM PC register 116 as the microprocessor 100 performs the x86 and ARM machine language programs, respectively, either to the next sequential instruction or to the target address of a branch instruction or to an exception handler address. As the microprocessor 100 performs instructions of x86 ISA and ARM ISA machine language programs, it fetches the ISA instructions of the machine language programs from system memory and places them into the instruction cache 102 replacing less recently fetched and performed instructions. The fetch unit 114 generates the fetch address 134 based on the x86 IP register 118 or ARM PC register 116 value, depending upon whether the instruction mode indicator 132 indicates the microprocessor 100 is currently fetching ISA instructions 124 in x86 or ARM mode. In one embodiment, the x86 IP register 118 and the ARM PC register 116 are implemented as a shared hardware instruction address register that provides its contents to the instruction fetch unit and branch predictor 114 and that is updated by the execution pipeline 112 according to x86 or ARM semantics based on whether the instruction mode indicator 132 indicates x86 or ARM, respectively.

The environment mode indicator 136 is state that indicates whether the microprocessor 100 is to apply x86 ISA or ARM ISA semantics to various execution environment aspects of the microprocessor 100 operation, such as virtual memory, exceptions, cache control, and global execution-time protection. Thus, the instruction mode indicator 132 and environment mode indicator 136 together create multiple modes of execution. In a first mode in which the instruction mode indicator 132 and environment mode indicator 136 both indicate x86 ISA, the microprocessor 100 operates as a normal x86 ISA processor. In a second mode in which the instruction mode indicator 132 and environment mode indicator 136 both indicate ARM ISA, the microprocessor 100 operates as a normal ARM ISA processor. A third mode, in which the instruction mode indicator 132 indicates x86 ISA but the environment mode indicator 136 indicates ARM ISA, may advantageously be used to perform user mode x86 machine language programs under the control of an ARM operating system or hypervisor, for example; conversely, a fourth mode, in which the instruction mode indicator 132 indicates ARM ISA but the environment mode indicator 136 indicates x86 ISA, may advantageously be used to perform user mode ARM machine language programs under the control of an x86 operating system or hypervisor, for example. The instruction mode indicator 132 and environment mode indicator 136 values are initially determined at reset. In one embodiment, the initial values are encoded as microcode constants but may be modified by a blown configuration fuse and/or microcode patch. In another embodiment, the initial values are provided by an external input to the microprocessor 100. In one embodiment, the environment mode indicator 136 may only be changed after reset by a reset-to-ARM 124 or reset-to-x86 instruction 124 (described below with respect to FIG. 6); that is, the environment mode indicator 136 may not be changed during normal operation of the microprocessor 100 without resetting the microprocessor 100, either by a normal reset or by a reset-to-x86 or reset-to-ARM instruction 124.

The hardware instruction translator 104 receives as input the x86 ISA and ARM ISA machine language instructions 124 and in response to each provides as output one or more microinstructions 126 that implement the x86 or ARM ISA instruction 124. The collective execution of the one or more implementing microinstructions 126 by the execution pipeline 112 implements the x86 or ARM ISA instruction 124. That is, the collective execution performs the operation specified by the x86 or ARM ISA instruction 124 on inputs specified by the x86 or ARM ISA instruction 124 to produce a result defined by the x86 or ARM ISA instruction 124. Thus, the hardware instruction translator 104 translates the x86 or ARM ISA instruction 124 into the one or more implementing microinstructions 126. The hardware instruction translator 104 comprises a collection of transistors arranged in a predetermined manner to translate the x86 ISA and ARM ISA machine language instructions 124 into the implementing microinstructions 126. The hardware instruction translator 104 comprises Boolean logic gates (e.g., of simple instruction translator 204 of FIG. 2) that generate the implementing microinstructions 126. In one embodiment, the hardware instruction translator 104 also comprises a microcode ROM (e.g., element 234 of the complex instruction translator 206 of FIG. 2) that the hardware instruction translator 104 employs to generate implementing microinstructions 126 for complex ISA instructions 124, as described in more detail with respect to FIG. 2. Preferably, the hardware instruction translator 104 is not necessarily capable of translating the entire set of ISA instructions 124 defined by the x86 programmer's manual nor the ARM programmer's manual but rather is capable of translating a subset of those instructions. More specifically, the subset of ISA instructions 124 defined by the x86 programmer's manual that the hardware instruction translator 104 translates does not necessarily correspond to any existing x86 ISA processor developed by Intel, and the subset of ISA instructions 124 defined by the ARM programmer's manual that the hardware instruction translator 104 translates does not necessarily correspond to any existing ISA processor developed by ARM Ltd. The one or more implementing microinstructions 126 that implement an x86 or ARM ISA instruction 124 may be provided to the execution pipeline 112 by the hardware instruction translator 104 all at once or as a sequence. Advantageously, the hardware instruction translator 104 provides the implementing microinstructions 126 directly to the execution pipeline 112 for execution without requiring them to be stored to memory in between. In the embodiment of the microprocessor 100 of FIG. 1, as the microprocessor 100 runs an x86 or ARM machine language program, each time the microprocessor 100 performs an x86 or ARM instruction 124, the hardware instruction translator 104 translates the x86 or ARM machine language instruction 124 into the implementing one or more microinstructions 126. However, the embodiment of FIG. 8 employs a microinstruction cache to potentially avoid re-translation each time the microprocessor 100 performs an x86 or ARM ISA instruction 124. Embodiments of the hardware instruction translator 104 are described in more detail with respect to FIG. 2.

The execution pipeline 112 executes the implementing microinstructions 126 provided by the hardware instruction translator 104. Broadly speaking, the execution pipeline 112 is a general purpose high-speed microinstruction processor, and other portions of the microprocessor 100, such as the hardware instruction translator 104, perform the bulk of the x86/ARM-specific functions, although functions performed by the execution pipeline 112 with x86/ARM-specific knowledge are discussed herein. In one embodiment, the execution pipeline 112 performs register renaming, superscalar issue, and out-of-order execution of the implementing microinstructions 126 received from the hardware instruction translator 104. The execution pipeline 112 is described in more detail with respect to FIG. 4.

The microarchitecture of the microprocessor 100 includes: (1) the microinstruction set; (2) a set of resources accessible by the microinstructions 126 of the microinstruction set, which is a superset of the x86 ISA and ARM ISA resources; and (3) a set of micro-exceptions the microprocessor 100 is defined to generate in response to executing the microinstructions 126, which is a superset of the x86 ISA and ARM ISA exceptions. The microarchitecture is distinct from the x86 ISA and the ARM ISA. More specifically, the microinstruction set is distinct from the x86 ISA and ARM ISA instruction sets in several aspects. First, there is not a one-to-one correspondence between the set of operations that the microinstructions of the microinstruction set may instruct the execution pipeline 112 to perform and the set of operations that the instructions of the x86 ISA and ARM ISA instruction sets may instruct the microprocessor to perform. Although many of the operations may be the same, there may be some operations specifiable by the microinstruction set that are not specifiable by the x86 ISA and/or the ARM ISA instruction sets; conversely, there may be some operations specifiable by the x86 ISA and/or the ARM ISA instruction sets that are not specifiable by the microinstruction set. Second, the microinstructions of the microinstruction set are encoded in a distinct manner from the manner in which the instructions of the x86 ISA and ARM ISA instruction sets are encoded. That is, although many of the same operations (e.g., add, shift, load, return) are specifiable by both the microinstruction set and the x86 ISA and ARM ISA instruction sets, there is not a one-to-one correspondence between the binary opcode value-to-operation mappings of the microinstruction set and the x86 or ARM ISA instruction sets. If there are binary opcode value-to-operation mappings that are the same in the microinstruction set and the x86 or ARM ISA instruction set, they are, generally speaking, by coincidence, and there is nevertheless not a one-to-one correspondence between them. Third, the fields of the microinstructions of the microinstruction set do not have a one-to-one correspondence with the fields of the instructions of the x86 or ARM ISA instruction set.

The microprocessor 100, taken as a whole, can perform x86 ISA and ARM ISA machine language program instructions. However, the execution pipeline 112 cannot execute x86 or ARM ISA machine language instructions themselves; rather, the execution pipeline 112 executes the implementing microinstructions 126 of the microinstruction set of the microarchitecture of the microprocessor 100 into which the x86 ISA and ARM ISA instructions are translated. However, although the microarchitecture is distinct from the x86 ISA and the ARM ISA, alternate embodiments are contemplated in which the microinstruction set and other microarchitecture-specific resources are exposed to the user; that is, in the alternate embodiments the microarchitecture may effectively be a third ISA, in addition to the x86 ISA and ARM ISA, whose machine language programs the microprocessor 100 can perform.

Table 1 below describes some of the fields of a microinstruction 126 of the microinstruction set according to one embodiment of the microprocessor 100.

TABLE 1

| Field | Description |
|---|---|
| opcode | operation to be performed (see instruction list below) |
| destination | specifies destination register of microinstruction result |
| source 1 | specifies source of first input operand (e.g., general purpose register, floating point register, microarchitecture-specific register, condition flags register, immediate, displacement, useful constants, the next sequential instruction pointer value) |
| source 2 | specifies source of second input operand |
| source 3 | specifies source of third input operand (cannot be GPR or FPR) |
| condition code | condition upon which the operation will be performed if satisfied and not performed if not satisfied |
| operand size | encoded number of bytes of operands used by this microinstruction |
| address size | encoded number of bytes of address generated by this microinstruction |
| top of x87 FP register stack | needed for x87-style floating point instructions |

Table 2 below describes some of the microinstructions in the microinstruction set according to one embodiment of the microprocessor 100.

TABLE 2

| Instruction | Description |
|---|---|
| ALU-type | e.g., add, subtract, rotate, shift, Boolean, multiply, divide, floating-point ALU, media-type ALU (e.g., packed operations) |
| load/store | load from memory into register/store to memory from register |
| conditional jump | jump to target address if condition is satisfied, e.g., zero, greater than, not equal; may specify either ISA flags or microarchitecture-specific (i.e., non-ISA visible) condition flags |
| move | move value from source register to destination register |
| conditional move | move value from source register to destination register if condition is satisfied |
| move to control register | move value from general purpose register to control register |
| move from control register | move value to general purpose register from control register |
| gprefetch | guaranteed cache line prefetch instruction (i.e., not a hint, always prefetches, unless certain exception conditions) |
| grabline | performs zero beat read-invalidate cycle on processor bus to obtain exclusive ownership of cache line without reading data from system memory (since it is known the entire cache line will be written) |
| load pram | load from PRAM (private microarchitecture-specific RAM, i.e., not visible to ISA, described more below) into register |

TABLE 2-continued

| Instruction | Description |
| --- | --- |
| store pram | store to PRAM |
| jump condition on/off | jump to target address if "static" condition is satisfied (within relevant timeframe, programmer guarantees there are no older, unretired microinstructions that may change the "static" condition); faster because resolved by complex instruction translator rather than execution pipeline |
| call | call subroutine |
| return | return from subroutine |
| set bit on/off | set/clear bit in register |
| copy bit | copy bit value from source register to destination register |
| branch to next sequential instruction pointer | branch to next sequential x86 or ARM ISA instruction after the x86 or ARM ISA instruction from which this microinstruction was translated |
| fence | wait until all microinstructions have drained from the execution pipeline to execute the microinstruction that comes after this microinstruction |
| indirect jump | unconditional jump through a register value |

The microprocessor 100 also includes some microarchitecture-specific resources, such as microarchitecture-specific general purpose registers, media registers, and segment registers (e.g., used for register renaming or by microcode) and control registers that are not visible by the x86 or ARM ISA, and a private RAM (PRAM) described more below. Additionally, the microarchitecture can generate exceptions, referred to as micro-exceptions, that are not specified by and are not seen by the x86 or ARM ISA, typically to perform a replay of a microinstruction 126 and dependent microinstructions 126, such as in the case of: a load miss in which the execution pipeline 112 assumes a load hit and replays the load microinstruction 126 if it misses; a TLB miss, to replay the microinstruction 126 after the page table walk and TLB fill; a floating point microinstruction 126 that received a denormal operand that was speculated to be normal that needs to be replayed after the execution pipeline 112 normalizes the operand; a load microinstruction 126 that was executed, but after which an older address-colliding store microinstruction 126 was detected, requiring the load microinstruction 126 to be replayed. It should be understood that the fields listed in Table 1, the microinstructions listed in Table 2, and the microarchitecture-specific resources and microarchitecture-specific exceptions just listed are merely given as examples to illustrate the microarchitecture and are by no means exhaustive.

The register file 106 includes hardware registers used by the microinstructions 126 to hold source and/or destination operands. The execution pipeline 112 writes its results 128 to the register file 106 and receives operands for the microinstructions 126 from the register file 106. The hardware registers instantiate the x86 ISA-defined and ARM ISA-defined registers. In one embodiment, many of the general purpose registers defined by the x86 ISA and the ARM ISA share some instances of registers of the register file 106. For example, in one embodiment, the register file 106 instantiates fifteen 32-bit registers that are shared by the ARM ISA registers R0 through R14 and the x86 ISA EAX through R14D registers. Thus, for example, if a first microinstruction 126 writes a value to the ARM R2 register, then a subsequent second microinstruction 126 that reads the x86 ECX register will receive the same value written by the first microinstruction 126, and vice versa. This advantageously enables x86 ISA and ARM ISA machine language programs to communicate quickly through registers. For example, assume an ARM machine language program running under an ARM machine language operating system effects a change in the instruction mode 132 to x86 ISA and control transfer to an x86 machine language routine to perform a function, which may be advantageous because the x86 ISA may support certain instructions that can perform a particular operation faster than in the ARM ISA. The ARM program can provide needed data to the x86 routine in shared registers of the register file 106. Conversely, the x86 routine can provide the results in shared registers of the register file 106 that will be visible to the ARM program upon return to it by the x86 routine. Similarly, an x86 machine language program running under an x86 machine language operating system may effect a change in the instruction mode 132 to ARM ISA and control transfer to an ARM machine language routine; the x86 program can provide needed data to the ARM routine in shared registers of the register file 106, and the ARM routine can provide the results in shared registers of the register file 106 that will be visible to the x86 program upon return to it by the ARM routine. A sixteenth 32-bit register that instantiates the x86 R15D register is not shared by the ARM R15 register since ARM R15 is the ARM PC register 116, which is separately instantiated. Additionally, in one embodiment, the thirty-two 32-bit ARM VFPv3 floating-point registers share 32-bit portions of the x86 sixteen 128-bit XMM0 through XMM15 registers and the sixteen 128-bit Advanced SIMD ("Neon") registers. The register file 106 also instantiates flag registers (namely the x86 EFLAGS register and ARM condition flags register), and the various control and status registers defined by the x86 ISA and ARM ISA. The architectural control and status registers include x86 architectural model specific registers (MSRs) and ARM-reserved coprocessor (8-15) registers. The register file 106 also instantiates non-architectural registers, such as non-architectural general purpose registers used in register renaming and used by microcode 234, as well as non-architectural x86 MSRs and implementation-defined, or vendor-specific, ARM coprocessor registers. The register file 106 is described further with respect to FIG. 5.

The memory subsystem 108 includes a cache memory hierarchy of cache memories (in one embodiment, a level-1 instruction cache 102, level-1 data cache, and unified level-2 cache). The memory subsystem 108 also includes various memory request queues, e.g., load, store, fill, snoop, write-combine buffer. The memory subsystem 108 also includes a memory management unit (MMU) that includes translation lookaside buffers (TLBs), preferably separate instruction and data TLBs. The memory subsystem 108 also includes a table walk engine for obtaining virtual to physical address translations in response to a TLB miss. Although shown separately in FIG. 1, the instruction cache 102 is logically part of the memory subsystem 108. The memory subsystem 108 is configured such that the x86 and ARM machine language programs share a common memory space, which advantageously enables x86 and ARM machine language programs to communicate easily through memory. The memory subsystem 108 is aware of the instruction mode 132 and environment mode 136 which enables it to perform various operations in the appropriate ISA context. For example, the memory subsystem 108 performs certain memory access violation checks (e.g., limit violation checks) based on whether the instruction mode indicator 132 indicates x86 or ARM ISA. For another example, in response to a change of the environment mode indicator 136, the memory subsystem 108 flushes the TLBs; however, the memory subsystem 108 does not flush the TLBs in response to a change of the instruction mode indicator 132, thereby enabling better performance in the third and fourth modes described above in which one of the instruction mode indicator 132 and environment mode indicator 136 indicates x86 and the other indicates ARM. For another example, in response to a TLB miss, the table walk engine performs a page table walk to populate the TLB using either x86 page tables or ARM page tables depending upon whether the environment mode indicator 136 indicates x86 ISA or ARM ISA. For another example, the memory subsystem 108 examines the architectural state of the appropriate x86 ISA control registers that affect the cache policies (e.g., CR0 CD and NW bits) if the state indicator 136 indicates x86 ISA and examines the architectural state of the appropriate ARM ISA control registers (e.g., SCTLR I and C bits) if the environment mode indicator 136 indicates ARM ISA. For another example, the memory subsystem 108 examines the architectural state of the appropriate x86 ISA control registers that affect the memory management (e.g., CR0 PG bit) if the state indicator 136 indicates x86 ISA and examines the architectural state of the appropriate ARM ISA control registers (e.g., SCTLR M bit) if the environment mode indicator 136 indicates ARM ISA. For another example, the memory subsystem 108 examines the architectural state of the appropriate x86 ISA control registers that affect the alignment checking (e.g., CR0 AM bit) if the state indicator 136 indicates x86 ISA and examines the architectural state of the appropriate ARM ISA control registers (e.g., SCTLR A bit) if the environment mode indicator 136 indicates ARM ISA. For another example, the memory subsystem 108 (as well as the hardware instruction translator 104 for privileged instructions) examines the architectural state of the appropriate x86 ISA control registers that specify the current privilege level (CPL) if the state indicator 136 indicates x86 ISA and examines the architectural state of the appropriate ARM ISA control registers that indicate user or privileged mode if the environment mode indicator 136 indicates ARM ISA. However, in one embodiment, the x86 ISA and ARM ISA share control bits/registers of the microprocessor 100 that have analogous function, rather than the microprocessor 100 instantiating separate control bits/registers for each ISA.

Although shown separately, the configuration registers 122 may be considered part of the register file 106. The configuration registers 122 include a global configuration register that controls operation of the microprocessor 100 in various aspects regarding the x86 ISA and ARM ISA, such as the ability to enable or disable various features. The global configuration register may be used to disable the ability of the microprocessor 100 to perform ARM ISA machine language programs, i.e., to make the microprocessor 100 an x86-only microprocessor 100, including disabling other relevant ARM-specific capabilities such as the launch-x86 and reset-to-x86 instructions 124 and implementation-defined coprocessor registers described herein. The global configuration register may also be used to disable the ability of the microprocessor 100 to perform x86 ISA machine language programs, i.e., to make the microprocessor 100 an ARM-only microprocessor 100, and to disable other relevant capabilities such as the launch-ARM and reset-to-ARM instructions 124 and new non-architectural MSRs described herein. In one embodiment, the microprocessor 100 is manufactured initially with default configuration settings, such as hardcoded values in the microcode 234, which the microcode 234 uses at initialization time to configure the microprocessor 100, namely to write the configuration registers 122. However, some configuration registers 122 are set by hardware rather than by microcode 234. Furthermore, the microprocessor 100 includes fuses, readable by the microcode 234, which may be blown to modify the default configuration values. In one embodiment, microcode 234 reads the fuses and performs an exclusive-OR operation with the default value and the fuse value and uses the result to write to the configuration registers 122. Still further, the modifying effect of the fuses may be reversed by a microcode 234 patch. The global configuration register may also be used, assuming the microprocessor 100 is configured to perform both x86 and ARM programs, to determine whether the microprocessor 100 (or a particular core 100 in a multi-core part, as described with respect to FIG. 7) will boot as an x86 or ARM microprocessor when reset, or in response to an x86-style INIT, as described in more detail below with respect to FIG. 6. The global configuration register also includes bits that provide initial default values for certain architectural control registers, for example, the ARM ISA SCTLT and CPACR registers. In a multi-core embodiment, such as described with respect to FIG. 7, there exists a single global configuration register, although each core is individually configurable, for example, to boot as either an x86 or ARM core, i.e., with the instruction mode indicator 132 and environment mode indicator 136 both set to x86 or ARM, respectively; furthermore, the launch-ARM instruction 126 and launch-x86 instruction 126 may be used to dynamically switch between the x86 and ARM instruction modes 132. In one embodiment, the global configuration register is readable via an x86 RDMSR instruction to a new non-architectural MSR and a portion of the control bits therein are writeable via an x86 WRMSR instruction to the new non-architectural MSR, and the global configuration register is readable via an ARM MRC/MRRC instruction to an ARM coprocessor register mapped to the new non-architectural MSR and the portion of the control bits therein are writeable via an ARM MCR/MCRR instruction to the ARM coprocessor register mapped to the new non-architectural MSR.

The configuration registers 122 also include various control registers that control operation of the microprocessor 100 in various aspects that are non-x86/ARM-specific, also referred to herein as global control registers, non-ISA control registers, non-x86/ARM control registers, generic control registers, and similar terms. In one embodiment, these control registers are accessible via both x86 RDMSR/WRMSR instructions to non-architectural MSRs and ARM MRC/MCR (or MRRC/MCRR) instructions to new implementation-defined coprocessor registers. For example, the microprocessor 100 includes non-x86/ARM-specific control registers that determine fine-grained cache control, i.e., finer-grained than provided by the x86 ISA and ARM ISA control registers.

In one embodiment, the microprocessor 100 provides ARM ISA machine language programs access to the x86 ISA MSRs via implementation-defined ARM ISA coprocessor registers that are mapped directly to the corresponding x86 MSRs. The MSR address is specified in the ARM ISA R1 register. The data is read from or written to the ARM ISA register(s) specified by the MRC/MRRC/MCR/MCRR instruction. In one embodiment, a subset of the MSRs are password protected, i.e., the instruction attempting to access the MSR must provide a password; in this embodiment, the password is specified in the ARM R7:R6 registers. If the access would cause an x86 general protection fault, the microprocessor 100 causes an ARM ISA UND exception. In one embodiment, ARM coprocessor 4 (address: 0, 7, 15, 0) is used to access the corresponding x86 MSRs.

The microprocessor 100 also includes an interrupt controller (not shown) coupled to the execution pipeline 112. In one embodiment, the interrupt controller is an x86-style advanced programmable interrupt controller (APIC) that maps x86 ISA interrupts into ARM ISA interrupts. In one embodiment, the x86 INTR maps to an ARM IRQ Interrupt; the x86 NMI maps to an ARM IRQ Interrupt; the x86 INIT causes an INIT-reset sequence from which the microprocessor 100 started in whichever ISA (x86 or ARM) it originally started out of a hardware reset; the x86 SMI maps to an ARM FIQ Interrupt; and the x86 STPCLK, A20, Thermal, PREQ, and Rebranch are not mapped to ARM interrupts. ARM machine language programs are enabled to access the APIC functions via new implementation-defined ARM coprocessor registers. In one embodiment, the APIC register address is specified in the ARM R0 register, and the APIC register addresses are the same as the x86 addresses. In one embodiment, ARM coprocessor 6 (address: 0, 7, nn, 0, where nn is 15 for accessing the APIC, and 12-14 for accessing the bus interface unit to perform 8-bit, 16-bit, and 32-bit IN/OUT cycles on the processor bus) is used for privileged mode functions typically employed by operating systems. The microprocessor 100 also includes a bus interface unit (not shown), coupled to the memory subsystem 108 and execution pipeline 112, for interfacing the microprocessor 100 to a processor bus. In one embodiment, the processor bus is conformant with one of the various Intel Pentium family microprocessor buses. ARM machine language programs are enabled to access the bus interface unit functions via new implementation-defined ARM coprocessor registers in order to generate I/O cycles on the processor bus, i.e., IN and OUT bus transfers to a specified address in I/O space, which are needed to communicate with a chipset of a system, e.g., to generate an SMI acknowledgement special cycle, or I/O cycles associated with C-state transitions. In one embodiment, the I/O address is specified in the ARM R0 register. In one embodiment, the microprocessor 100 also includes power management capabilities, such as the well-known P-state and C-state management. ARM machine language programs are enabled to perform power management via new implementation-defined ARM coprocessor registers. In one embodiment, the microprocessor 100 also includes an encryption unit (not shown) in the execution pipeline 112. In one embodiment, the encryption unit is substantially similar to the encryption unit of VIA microprocessors that include the Padlock capability. ARM machine language programs are enabled to access the encryption unit functions, such as encryption instructions, via new implementation-defined ARM coprocessor registers. In one embodiment ARM coprocessor 5 is used for user mode functions typically employed by user mode application programs, such as those that may use the encryption unit feature.

As the microprocessor 100 runs x86 ISA and ARM ISA machine language programs, the hardware instruction translator 104 performs the hardware translation each time the microprocessor 100 performs an x86 or ARM ISA instruction 124. It is noted that, in contrast, a software translator-based system may be able to improve its performance by re-using a translation in many cases rather than re-translating a previously translated machine language instruction. Furthermore, the embodiment of FIG. 8 employs a microinstruction cache to potentially avoid re-translation each time the microprocessor 100 performs an x86 or ARM ISA instruction 124. Each approach may have performance advantages depending upon the program characteristics and the particular circumstances in which the program is run.

The branch predictor 114 caches history information about previously performed both x86 and ARM branch instructions. The branch predictor 114 predicts the presence and target address of both x86 and ARM branch instructions 124 within a cache line as it is fetched from the instruction cache 102 based on the cached history. In one embodiment, the cached history includes the memory address of the branch instruction 124, the branch target address, a direction (taken/not taken) indicator, type of branch instruction, start byte within the cache line of the branch instruction, and an indicator of whether the instruction wraps across multiple cache lines. In one embodiment, the branch predictor 114 is enhanced to predict the direction of ARM ISA conditional non-branch instructions, as described in U.S. Provisional Application No. 61/473,067, filed Apr. 7, 2011, entitled APPARATUS AND METHOD FOR USING BRANCH PREDICTION TO EFFICIENTLY EXECUTE CONDITIONAL NON-BRANCH INSTRUCTIONS. In one embodiment, the hardware instruction translator 104 also includes a static branch predictor that predicts a direction and branch target address for both x86 and ARM branch instructions based on the opcode, condition code type, backward/forward, and so forth.

Various embodiments are contemplated that implement different combinations of features defined by the x86 ISA and ARM ISA. For example, in one embodiment, the microprocessor 100 implements the ARM, Thumb, ThumbEE, and Jazelle instruction set states, but provides a trivial implementation of the Jazelle extension; and implements the following instruction set extensions: Thumb-2, VFPv3-D32, Advanced SIMD ("Neon"), multiprocessing, and VMSA; and does not implement the following extensions: security extensions, fast context switch extension, ARM debug features (however, x86 debug functions are accessible by ARM programs via ARM MCR/MRC instructions to new implementation-defined coprocessor registers), performance monitoring counters (however, x86 performance counters are accessible by ARM programs via the new implementation-defined coprocessor registers). For another example, in one embodiment, the microprocessor 100 treats the ARM SETEND instruction as a NOP and only supports the Little-endian data format. For another example, in one embodiment, the microprocessor 100 does not implement the x86 SSE 4.2 capabilities.

Embodiments are contemplated in which the microprocessor 100 is an enhancement of a commercially available microprocessor, namely a VIA Nano™ Processor manufactured by VIA Technologies, Inc., of Taipei, Taiwan, which is capable of running x86 ISA machine language programs but not ARM ISA machine language programs. The Nano microprocessor includes a high performance register-renaming, superscalar instruction issue, out-of-order execution pipeline and a hardware translator that translates x86 ISA instructions into microinstructions for execution by the execution pipeline. The Nano hardware instruction translator may be substantially enhanced as described herein to translate ARM ISA machine language instructions, in addition to x86 machine language instructions, into the microinstructions executable by the execution pipeline. The enhancements to the hardware instruction translator may include enhancements to both the simple instruction translator and to the complex instruction translator, including the microcode. Additionally, new microinstructions may be added to the microinstruction set to support the translation of ARM ISA machine language instructions into the microinstructions, and the execution pipeline may be enhanced to execute the new microinstructions. Furthermore, the Nano register file and memory subsystem may be substantially enhanced as described herein to support the ARM ISA, including sharing of certain registers. The branch prediction units may also be enhanced as described herein to accommodate ARM branch instruction prediction in addition to x86 branches. Advantageously, a relatively modest amount of modification is required to the execution pipeline of the Nano microprocessor to accommodate the ARM ISA instructions since it is already largely ISA-agnostic. Enhancements to the execution pipeline may include the manner in which condition code flags are generated and used, the semantics used to update and report the instruction pointer register, the access privilege protection method, and various memory management-related functions, such as access violation checks, paging and TLB use, and cache policies, which are listed only as illustrative examples, and some of which are described more below. Finally, as mentioned above, various features defined in the x86 ISA and ARM ISA may not be supported in the Nano-enhancement embodiments, such as x86 SSE 4.2 and ARM security extensions, fast context switch extension, debug, and performance counter features, which are listed only as illustrative examples, and some of which are described more below. The enhancement of the Nano processor to support running ARM ISA machine language programs is an example of an embodiment that makes synergistic use of design, testing, and manufacturing resources to potentially bring to market in a timely fashion a single integrated circuit design that can run both x86 and ARM machine language programs, which represent the vast majority of existing machine language programs. In particular, embodiments of the microprocessor 100 design described herein may be configured as an x86 microprocessor, an ARM microprocessor, or a microprocessor that can concurrently run both x86 ISA and ARM ISA machine language programs. The ability to concurrently run both x86 ISA and ARM ISA machine language programs may be achieved through dynamic switching between the x86 and ARM instruction modes 132 on a single microprocessor 100 (or core 100—see FIG. 7), through configuring one or more cores 100 in a multi-core microprocessor 100 (as described with respect to FIG. 7) as an ARM core and one or more cores as an x86 core, or through a combination of the two, i.e., dynamic switching between the x86 and ARM instruction modes 132 on each of the multiple cores 100. Furthermore, historically, ARM ISA cores have been designed as intellectual property cores to be incorporated into applications by various third-party vendors, such as SOC and/or embedded applications. Therefore, the ARM ISA does not specify a standardized processor bus to interface the ARM core to the rest of the system, such as a chipset or other peripheral devices. Advantageously, the Nano processor already includes a high speed x86-style processor bus interface to memory and peripherals and a memory coherency structure that may be employed synergistically by the microprocessor 100 to support running ARM ISA machine language programs in an x86 PC-style system environment.

Figure 2:
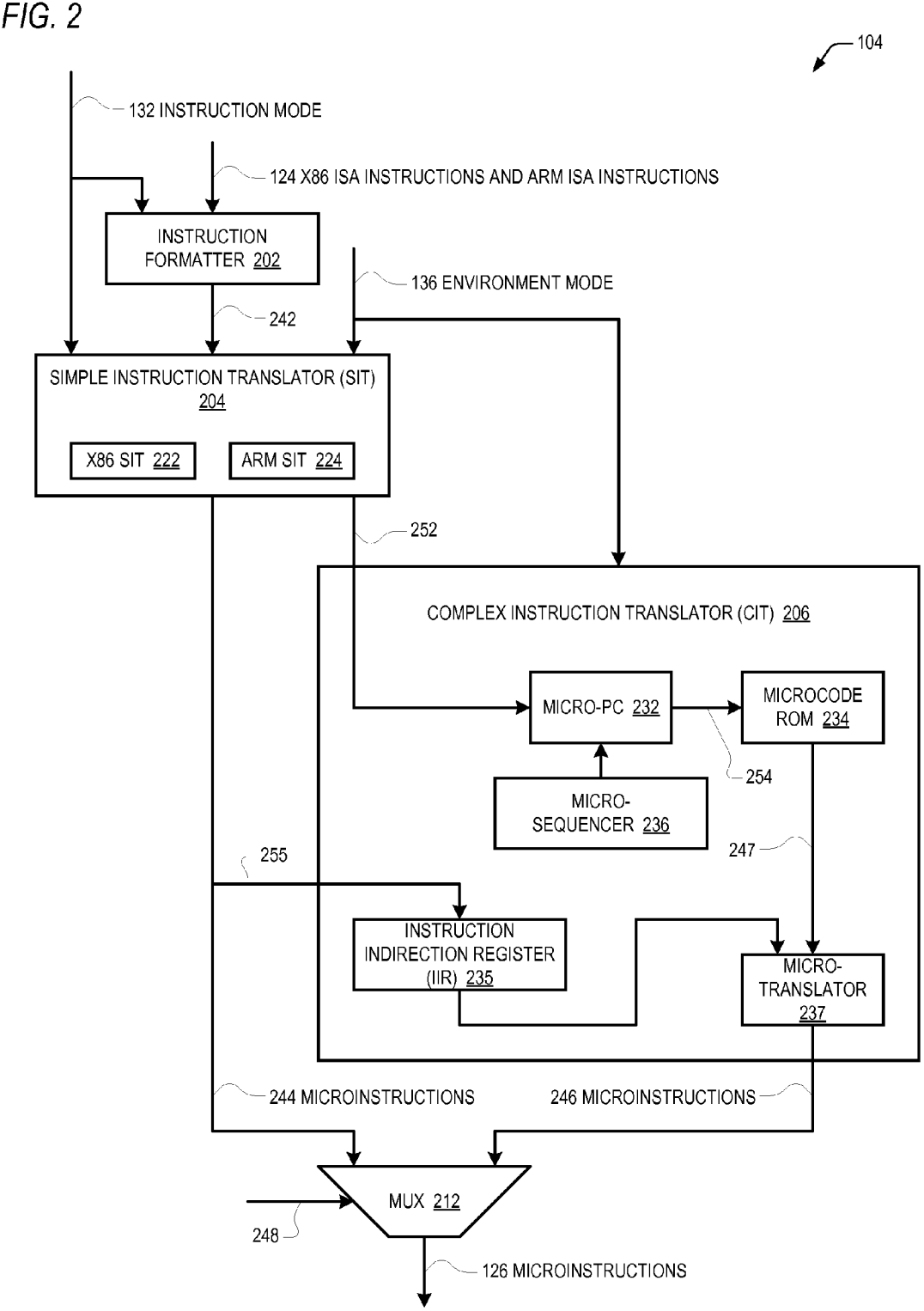
FIG. 2 is a block diagram illustrating in more detail the hardware instruction translator of FIG. 1.

Referring now to FIG. 2, a block diagram illustrating in more detail the hardware instruction translator 104 of FIG. 1 is shown. The hardware instruction translator 104 comprises hardware, more specifically a collection of transistors. The hardware instruction translator 104 includes an instruction formatter 202 that receives the instruction mode indicator 132 and the blocks of x86 ISA and ARM ISA instruction bytes 124 from the instruction cache 102 of FIG. 1 and outputs formatted x86 ISA and ARM ISA instructions 242; a simple instruction translator (SIT) 204 that receives the instruction mode indicator 132 and environment mode indicator 136 and outputs implementing microinstructions 244 and a microcode address 252; a complex instruction translator (CIT) 206 (also referred to as a microcode unit) that receives the microcode address 252 and the environment mode indicator 136 and provides implementing microinstructions 246; and a mux 212 that receives microinstructions 244 from the simple instruction translator 204 on one input and that receives the microinstructions 246 from the complex instruction translator 206 on the other input and that provides the implementing microinstructions 126 to the execution pipeline 112 of FIG. 1. The instruction formatter 202 is described in more detail with respect to FIG. 3. The simple instruction translator 204 includes an x86 SIT 222 and an ARM SIT 224. The complex instruction translator 206 includes a micro-program counter (micro-PC) 232 that receives the microcode address 252, a microcode read only memory (ROM) 234 that receives a ROM address 254 from the micro-PC 232, a microsequencer 236 that updates the micro-PC 232, an instruction indirection register (IIR) 235, and a microtranslator 237 that generates the implementing microinstructions 246 output by the complex instruction translator 206. Both the implementing microinstructions 244 generated by the simple instruction translator 204 and the implementing microinstructions 246 generated by the complex instruction translator 206 are microinstructions 126 of the microinstruction set of the microarchitecture of the microprocessor 100 and which are directly executable by the execution pipeline 112.

The mux 212 is controlled by a select input 248. Normally, the mux 212 selects the microinstructions from the simple instruction translator 204; however, when the simple instruction translator 204 encounters a complex x86 or ARM ISA instruction 242 and transfers control, or traps, to the complex instruction translator 206, the simple instruction translator 204 controls the select input 248 to cause the mux 212 to select microinstructions 246 from the complex instruction translator 206. When the RAT 402 (of FIG. 4) encounters a microinstruction 126 with a special bit set to indicate it is the last microinstruction 126 in the sequence implementing the complex ISA instruction 242, the RAT 402 controls the select input 248 to cause the mux 212 to return to selecting microinstructions 244 from the simple instruction translator 204. Additionally, the reorder buffer 422 controls the select input 248 to cause the mux 212 to select microinstructions 246 from the complex instruction translator 206 when the reorder buffer 422 (see FIG. 4) is ready to retire a microinstruction 126 whose status requires such, for example if the status indicates the microinstruction 126 has caused an exception condition.

The simple instruction translator 204 receives the ISA instructions 242 and decodes them as x86 ISA instructions if the instruction mode indicator 132 indicate x86 and decodes them as ARM ISA instructions if the instruction mode indicator 132 indicates ARM. The simple instruction translator 204 also determines whether the ISA instructions 242 are simple or complex ISA instructions. A simple ISA instruction 242 is one for which the simple instruction translator 204 can emit all the implementing microinstructions 126 that implement the ISA instruction 242; that is, the complex instruction translator 206 does not provide any of the implementing microinstructions 126 for a simple ISA instruction 124. In contrast, a complex ISA instruction 124 requires the complex instruction translator 206 to provide at least some, if not all, of the implementing microinstructions 126. In one embodiment, for a subset of the instructions 124 of the ARM and x86 ISA instruction sets, the simple instruction translator 204 emits a portion of the microinstructions 244 that implement the x86/ARM ISA instruction 126 and then transfers control to the complex instruction translator 206 which subsequently emits the remainder of the microinstructions 246 that implement the 86/ARM ISA instruction 126. The mux 212 is controlled to first provide the implementing microinstructions 244 from the simple instruction translator 204 as microinstructions 126 to the execution pipeline 112 and second to provide the implementing microinstructions 246 from the complex instruction translator 206 as microinstructions 126 to the execution pipeline 112. The simple instruction translator 204 knows the starting microcode ROM 234 address of the various microcode routines employed by the hardware instruction translator 104 to generate the implementing microinstructions 126 for various complex ISA instructions 124, and when the simple instruction translator 204 decodes a complex ISA instruction 242, it provides the relevant microcode routine address 252 to the micro-PC 232 of the complex instruction translator 206. The simple instruction translator 204 emits all the microinstructions 244 needed to implement a relatively large percentage of the instructions 124 of the ARM and x86 ISA instruction sets, particularly ISA instructions 124 that tend to be performed by x86 ISA and ARM ISA machine language programs with a high frequency, and only a relatively small percentage requires the complex instruction translator 206 to provide implementing microinstructions 246. According to one embodiment, examples of x86 instructions that are primarily implemented by the complex instruction translator 206 are the RDMSR/WRMSR, CPUID, complex mathematical instructions (e.g., FSQRT and transcendental instructions), and IRET instructions; and examples of ARM instructions that are primarily implemented by the complex instruction translator 206 are the MCR, MRC, MSR, MRS, SRS, and RFE instructions. The preceding list is by no means exhaustive, but provides an indication of the type of ISA instructions implemented by the complex instruction translator 206.

When the instruction mode indicator 132 indicates x86, the x86 SIT 222 decodes the x86 ISA instructions 242 and translates them into the implementing microinstructions 244; when the instruction mode indicator 132 indicates ARM, the ARM SIT 224 decodes the ARM ISA instructions 242 and translates them into the implementing microinstructions 244. In one embodiment, the simple instruction translator 204 is a block of Boolean logic gates synthesized using well-known synthesis tools. In one embodiment, the x86 SIT 222 and the ARM SIT 224 are separate blocks of Boolean logic gates; however, in another embodiment, the x86 SIT 222 and the ARM SIT 224 are a single block of Boolean logic gates. In one embodiment, the simple instruction translator 204 translates up to three ISA instructions 242 and provides up to six implementing microinstructions 244 to the execution pipeline 112 per clock cycle. In one embodiment, the simple instruction translator 204 comprises three sub-translators (not shown) that each translate a single formatted ISA instruction 242: the first sub-translator is capable of translating a formatted ISA instruction 242 that requires no more than three implementing microinstructions 126; the second sub-translator is capable of translating a formatted ISA instruction 242 that requires no more than two implementing microinstructions 126; and the third sub-translator is capable of translating a formatted ISA instruction 242 that requires no more than one implementing microinstruction 126. In one embodiment, the simple instruction translator 204 includes a hardware state machine that enables it to output multiple microinstructions 244 that implement an ISA instruction 242 over multiple clock cycles.

In one embodiment, the simple instruction translator 204 also performs various exception checks based on the instruction mode indicator 132 and/or environment mode indicator 136. For example, if the instruction mode indicator 132 indicates x86 and the x86 SIT 222 decodes an ISA instruction 124 that is invalid for the x86 ISA, then the simple instruction translator 204 generates an x86 invalid opcode exception; similarly, if the instruction mode indicator 132 indicates ARM and the ARM SIT 224 decodes an ISA instruction 124 that is invalid for the ARM ISA, then the simple instruction translator 204 generates an ARM undefined instruction exception. For another example, if the environment mode indicator 136 indicates the x86 ISA, then the simple instruction translator 204 checks to see whether each x86 ISA instruction 242 it encounters requires a particular privilege level and, if so, checks whether the CPL satisfies the required privilege level for the x86 ISA instruction 242 and generates an exception if not; similarly, if the environment mode indicator 136 indicates the ARM ISA, then the simple instruction translator 204 checks to see whether each formatted ARM ISA instruction 242 is a privileged mode instruction and, if so, checks whether the current mode is a privileged mode and generates an exception if the current mode is user mode. The complex instruction translator 206 performs a similar function for certain complex ISA instructions 242.

The complex instruction translator 206 outputs a sequence of implementing microinstructions 246 to the mux 212. The microcode ROM 234 stores ROM instructions 247 of microcode routines. The microcode ROM 234 outputs the ROM instructions 247 in response to the address of the next ROM instruction 247 to be fetched from the microcode ROM 234, which is held by the micro-PC 232. Typically, the micro-PC 232 receives its initial value 252 from the simple instruction translator 204 in response to the simple instruction translator 204 decoding a complex ISA instruction 242. In other cases, such as in response to a reset or exception, the micro-PC 232 receives the address of the reset microcode routine address or appropriate microcode exception handler address, respectively. The microsequencer 236 updates the micro-PC 232 normally by the size of a ROM instruction 247 to sequence through microcode routines and alternatively to a target address generated by the execution pipeline 112 in response to execution of a control type microinstruction 126, such as a branch instruction, to effect branches to non-sequential locations in the microcode ROM 234. The microcode ROM 234 is manufactured within the semiconductor die of the microprocessor 100.

In addition to the microinstructions 244 that implement a simple ISA instruction 124 or a portion of a complex ISA instruction 124, the simple instruction translator 204 also generates ISA instruction information 255 that is written to the instruction indirection register (IIR) 235. The ISA instruction information 255 stored in the IIR 235 includes information about the ISA instruction 124 being translated, for example, information identifying the source and destination registers specified by the ISA instruction 124 and the form of the ISA instruction 124, such as whether the ISA instruction 124 operates on an operand in memory or in an architectural register 106 of the microprocessor 100. This enables the microcode routines to be generic, i.e., without having to have a different microcode routine for each different source and/or destination architectural register 106. In particular, the simple instruction translator 204 is knowledgeable of the register file 106, including which registers are shared registers 504, and translates the register information provided in the x86 ISA and ARM ISA instructions 124 to the appropriate register in the register file 106 via the ISA instruction information 255. The ISA instruction information 255 also includes a displacement field, an immediate field, a constant field, rename information for each source operand as well as for microinstruction 126 itself, information to indicate the first and last microinstruction 126 in the sequence of microinstructions 126 that implement the ISA instruction 124, and other bits of useful information gleaned from the decode of the ISA instruction 124 by the hardware instruction translator 104.

The microtranslator 237 receives the ROM instructions 247 from the microcode ROM 234 and the contents of the IIR 235. In response, the microtranslator 237 generates implementing microinstructions 246. The microtranslator 237 translates certain ROM instructions 247 into different sequences of microinstructions 246 depending upon the information received from the IIR 235, such as depending upon the form of the ISA instruction 124 and the source and/or destination architectural register 106 combinations specified by them. In many cases, much of the ISA instruction information 255 is merged with the ROM instruction 247 to generate the implementing microinstructions 246. In one embodiment, each ROM instruction 247 is approximately 40 bits wide and each microinstruction 246 is approximately 200 bits wide. In one embodiment, the microtranslator 237 is capable of generating up to three microinstructions 246 from a ROM instruction 247. The microtranslator 237 comprises Boolean logic gates that generate the implementing microinstructions 246.

An advantage provided by the microtranslator 237 is that the size of the microcode ROM 234 may be reduced since it does not need to store the ISA instruction information 255 provided by the IIR 235 since the simple instruction translator 204 generates the ISA instruction information 255. Furthermore, the microcode ROM 234 routines may include fewer conditional branch instructions because it does not need to include a separate routine for each different ISA instruction form and for each source and/or destination architectural register 106 combination. For example, if the complex ISA instruction 124 is a memory form, the simple instruction translator 204 may generate a prolog of microinstructions 244 that includes microinstructions 244 to load the source operand from memory into a temporary register 106, and the microtranslator 237 may generate a microinstruction 246 to store the result from the temporary register to memory; whereas, if the complex ISA instruction 124 is a register form, the prolog may move the source operand from the source register specified by the ISA instruction 124 to the temporary register 106, and the microtranslator 237 may generate a microinstruction 246 to move the result from a temporary register to the architectural destination register 106 specified by the IIR 235. In one embodiment, the microtranslator 237 is similar in many respects to the microtranslator 237 described in U.S. patent application Ser. No. 12/766,244, filed on Apr. 23, 2010, which is hereby incorporated by reference in its entirety for all purposes, but which is modified to translate ARM ISA instructions 124 in addition to x86 ISA instructions 124.

It is noted that the micro-PC 232 is distinct from the ARM PC 116 and the x86 IP 118; that is, the micro-PC 232 does not hold the address of ISA instructions 124, and the addresses held in the micro-PC 232 are not within the system memory address space. It is further noted that the microinstructions 246 are produced by the hardware instruction translator 104 and provided directly to the execution pipeline 112 for execution rather than being results 128 of the execution pipeline 112.

Figure 3:
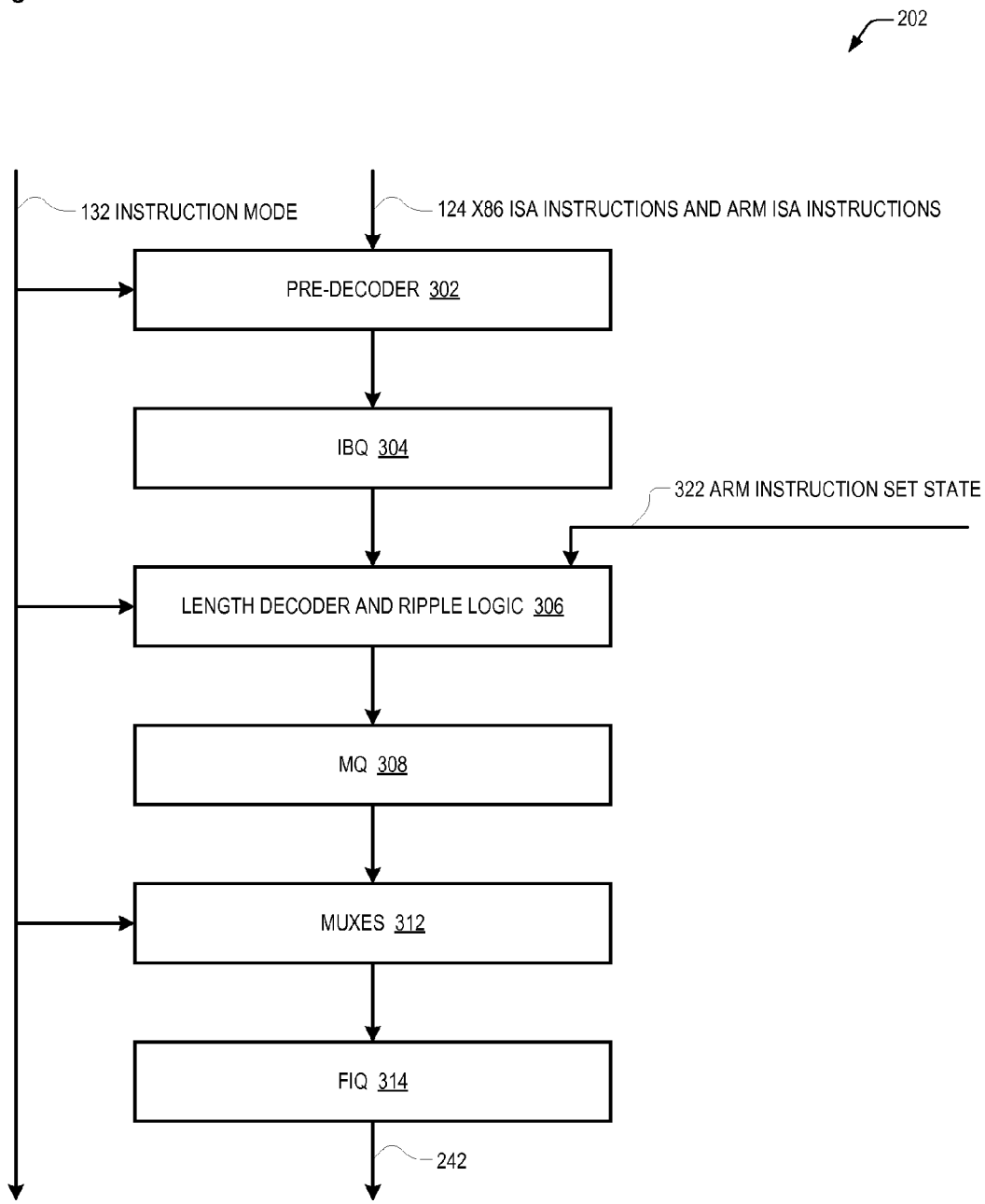
FIG. 3 is a block diagram illustrating in more detail the instruction formatter of FIG. 2.

Referring now to FIG. 3, a block diagram illustrating in more detail the instruction formatter 202 of FIG. 2 is shown. The instruction formatter 202 receives a block of the x86 ISA and ARM ISA instruction bytes 124 from the instruction cache 102 of FIG. 1. By virtue of the variable length nature of x86 ISA instructions, an x86 instruction 124 may begin in any byte within a block of instruction bytes 124. The task of determining the length and location of an x86 ISA instruction within a cache block is further complicated by the fact that the x86 ISA allows prefix bytes and the length may be affected by current address length and operand length default values. Furthermore, ARM ISA instructions are either 2-byte or 4-byte length instructions and are 2-byte or 4-byte aligned, depending upon the current ARM instruction set state 322 and the opcode of the ARM ISA instruction 124. Therefore, the instruction formatter 202 extracts distinct x86 ISA and ARM ISA instructions from the stream of instruction bytes 124 made up of the blocks received from the instruction cache 102. That is, the instruction formatter 202 formats the stream of x86 ISA and ARM ISA instruction bytes, which greatly simplifies the already difficult task of the simple instruction translator 204 of FIG. 2 to decode and translate the ISA instructions 124.

The instruction formatter 202 includes a pre-decoder 302 that pre-decodes the instruction bytes 124 as x86 instruction bytes if the instruction mode indicator 132 indicates x86 and pre-decodes the instruction bytes 124 as ARM instruction bytes if the instruction mode indicator 132 indicates ARM to generate pre-decode information. An instruction byte queue (IBQ) 304 receives the block of ISA instruction bytes 124 and associated pre-decode information generated by the pre-decoder 302.

An array of length decoders and ripple logic 306 receives the contents of the bottom entry of the IBQ 304, namely a block of ISA instruction bytes 124 and associated pre-decode information. The length decoders and ripple logic 306 also receives the instruction mode indicator 132 and the ARM ISA instruction set state 322. In one embodiment, the ARM ISA instruction set state 322 comprises the J and T bits of the ARM ISA CPSR register. In response to its inputs, the length decoders and ripple logic 306 generates decode information including the length of x86 and ARM instructions in the block of ISA instruction bytes 124, x86 prefix information, and indicators associated with each of the ISA instruction bytes 124 indicating whether the byte is the start byte of an ISA instruction 124, the end byte of an ISA instruction 124, and/or a valid byte of an ISA instruction 124. A mux queue (MQ) 308 receives a block of the ISA instruction bytes 126, its associated pre-decode information generated by the pre-decoder 302, and the associated decode information generated by the length decoders and ripple logic 306.

Control logic (not shown) examines the contents of the bottom MQ 308 entries and controls muxes 312 to extract distinct, or formatted, ISA instructions and associated pre-decode and decode information, which are provided to a formatted instruction queue (FIQ) 314. The FIQ 314 buffers the formatted ISA instructions 242 and related information for provision to the simple instruction translator 204 of FIG. 2. In one embodiment, the muxes 312 extract up to three formatted ISA instructions and related information per clock cycle.

In one embodiment, the instruction formatter 202 is similar in many ways to the XIBQ, instruction formatter, and FIQ collectively as described in U.S. patent application Ser. Nos.

12/571,997; 12/572,002; 12/572,045; 12/572,024; 12/572,052; 12/572,058, each filed on Oct. 1, 2009, which are hereby incorporated by reference herein for all purposes. However, the XIBQ, instruction formatter, and FIQ of the above patent applications are modified to format ARM ISA instructions 124 in addition to x86 ISA instructions 124. The length decoder 306 is modified to decode ARM ISA instructions 124 to generate their length and start, end, and valid byte indicators. In particular, if the instruction mode indicator 132 indicates ARM ISA, the length decoder 306 examines the current ARM instruction set state 322 and the opcode of the ARM ISA instruction 124 to determine whether the ARM instruction 124 is a 2-byte or 4-byte length instruction. In one embodiment, the length decoder 306 includes separate length decoders for generating the length of x86 ISA instructions 124 and for generating the length of ARM ISA instructions 124, and tri-state outputs of the separate length decoders are wire-ORed together for provision to the ripple logic 306. In one embodiment, the formatted instruction queue (FIQ) 314 comprises separate queues for holding separate portions of the formatted instructions 242. In one embodiment, the instruction formatter 202 provides the simple instruction translator 204 up to three formatted ISA instructions 242 per clock cycle.

Figure 4:
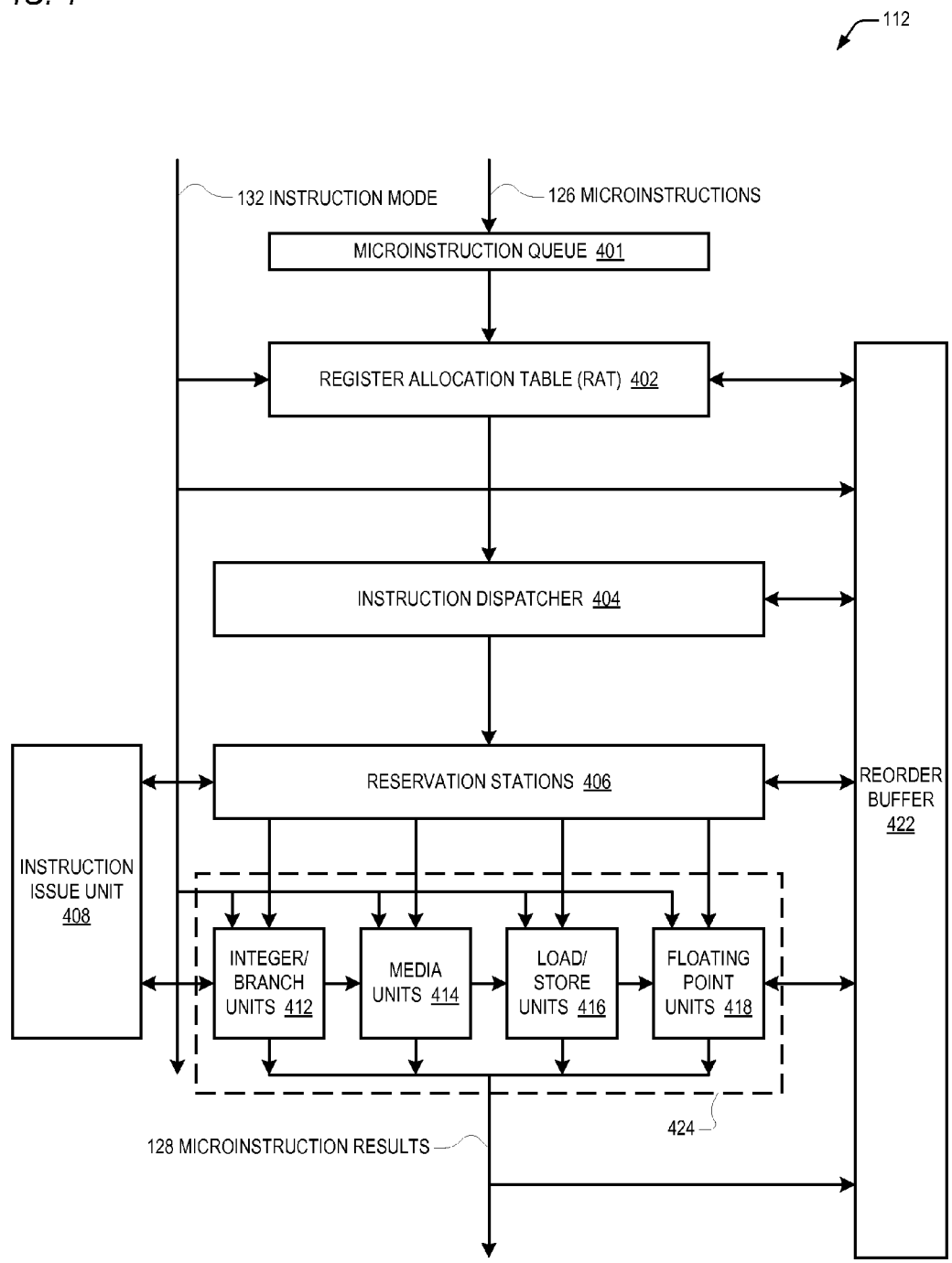
FIG. 4 is a block diagram illustrating in more detail the execution pipeline of FIG. 1.

Referring now to FIG. 4, a block diagram illustrating in more detail the execution pipeline 112 of FIG. 1 is shown. The execution pipeline 112 is coupled to receive the implementing microinstructions 126 directly from the hardware instruction translator 104 of FIG. 2. The execution pipeline 112 includes a microinstruction queue 401 that receives the microinstructions 126; a register allocation table (RAT) 402 that receives the microinstructions from the microinstruction queue 401; an instruction dispatcher 404 coupled to the RAT 402; reservation stations 406 coupled to the instruction dispatcher 404; an instruction issue unit 408 coupled to the reservation stations 406; a reorder buffer (ROB) 422 coupled to the RAT 402, instruction dispatcher 404, and reservation stations 406, and execution units 424 coupled to the reservation stations 406, instruction issue unit 408, and ROB 422. The RAT 402 and execution units 424 receive the instruction mode indicator 132.

The microinstruction queue 401 operates as a buffer in circumstances where the rate at which the hardware instruction translator 104 generates the implementing microinstructions 126 differs from the rate at which the execution pipeline 112 executes them. In one embodiment, the microinstruction queue 401 comprises an M-to-N compressible microinstruction queue that enables the execution pipeline 112 to receive up to M (in one embodiment M is six) microinstructions 126 from the hardware instruction translator 104 in a given clock cycle and yet store the received microinstructions 126 in an N-wide queue (in one embodiment N is three) structure in order to provide up to N microinstructions 126 per clock cycle to the RAT 402, which is capable of processing up to N microinstructions 126 per clock cycle. The microinstruction queue 401 is compressible in that it does not leave holes among the entries of the queue, but instead sequentially fills empty entries of the queue with the microinstructions 126 as they are received from the hardware instruction translator 104 regardless of the particular clock cycles in which the microinstructions 126 are received. This advantageously enables high utilization of the execution units 424 (of FIG. 4) in order to achieve high instruction throughput while providing advantages over a non-compressible M-wide or N-wide instruction queue. More specifically, a non-compressible N-wide queue would require the hardware instruction translator 104, in particular the simple instruction translator 204, to re-translate in a subsequent clock cycle one or more ISA instructions 124 that it already translated in a previous clock cycle because the non-compressible N-wide queue could not receive more than N microinstructions 126 per clock cycle, and the re-translation wastes power; whereas, a non-compressible M-wide queue, although not requiring the simple instruction translator 204 to re-translate, would create holes among the queue entries, which is wasteful and would require more rows of entries and thus a larger and more power-consuming queue in order to accomplish comparable buffering capability.

The RAT 402 receives the microinstructions 126 from the microinstruction queue 401 and generates dependency information regarding the pending microinstructions 126 within the microprocessor 100 and performs register renaming to increase the microinstruction parallelism to take advantage of the superscalar, out-of-order execution ability of the execution pipeline 112. If the ISA instructions 124 indicates x86, then the RAT 402 generates the dependency information and performs the register renaming with respect to the x86 ISA registers 106 of the microprocessor 100; whereas, if the ISA instructions 124 indicates ARM, then the RAT 402 generates the dependency information and performs the register renaming with respect to the ARM ISA registers 106 of the microprocessor 100; however, as mentioned above, some of the registers 106 may be shared by the x86 ISA and ARM ISA. The RAT 402 also allocates an entry in the ROB 422 for each microinstruction 126 in program order so that the ROB 422 can retire the microinstructions 126 and their associated x86 ISA and ARM ISA instructions 124 in program order, even though the microinstructions 126 may execute out of program order with respect to the x86 ISA and ARM ISA instructions 124 they implement. The ROB 422 comprises a circular queue of entries, each for storing information related to a pending microinstruction 126. The information includes, among other things, microinstruction 126 execution status, a tag that identifies the x86 or ARM ISA instruction 124 from which the microinstruction 126 was translated, and storage for storing the results of the microinstruction 126.

The instruction dispatcher 404 receives the register-renamed microinstructions 126 and dependency information from the RAT 402 and, based on the type of instruction and availability of the execution units 424, dispatches the microinstructions 126 and their associated dependency information to the reservation station 406 associated with the appropriate execution unit 424 that will execute the microinstruction 126.

The instruction issue unit 408, for each microinstruction 126 waiting in a reservation station 406, detects that the associated execution unit 424 is available and the dependencies are satisfied (e.g., the source operands are available) and issues the microinstruction 126 to the execution unit 424 for execution. As mentioned, the instruction issue unit 408 can issue the microinstructions 126 for execution out of program order and in a superscalar fashion.

In one embodiment, the execution units 424 include integer/branch units 412, media units 414, load/store units 416, and floating point units 418. The execution units 424 execute the microinstructions 126 to generate results 128 that are provided to the ROB 422. Although the execution units 424 are largely agnostic of whether the microinstructions 126 they are executing were translated from an x86 or ARM ISA instruction 124, the execution units 424 use the instruction mode indicator 132 and environment mode indicator 136 to execute a relatively small subset of the microinstructions 126. For example, the execution pipeline 112 handles the generation of flags slightly differently based on whether the instruction mode indicator 132 indicates the x86 ISA or the ARM ISA and updates the x86 EFLAGS register or ARM condition code flags in the PSR depending upon whether the instruction mode indicator 132 indicates the x86 ISA or the ARM ISA. For another example, the execution pipeline 112 samples the instruction mode indicator 132 to decide whether to update the x86 IP 118 or the ARM PC 116, or common instruction address register, and whether to use x86 or ARM semantics to do so. Once a microinstruction 126 becomes the oldest completed microinstruction 126 in the microprocessor 100 (i.e., at the head of the ROB 422 queue and having a completed status) and all other microinstructions 126 that implement the associated ISA instruction 124 are complete, the ROB 422 retires the ISA instruction 124 and frees up the entries associated with the implementing microinstructions 126. In one embodiment, the microprocessor 100 can retire up to three ISA instructions 124 per clock cycle. Advantageously, the execution pipeline 112 is a high performance, general purpose execution engine that executes microinstructions 126 of the microarchitecture of the microprocessor 100 that supports both x86 ISA and ARM ISA instructions 124.

Figure 5:
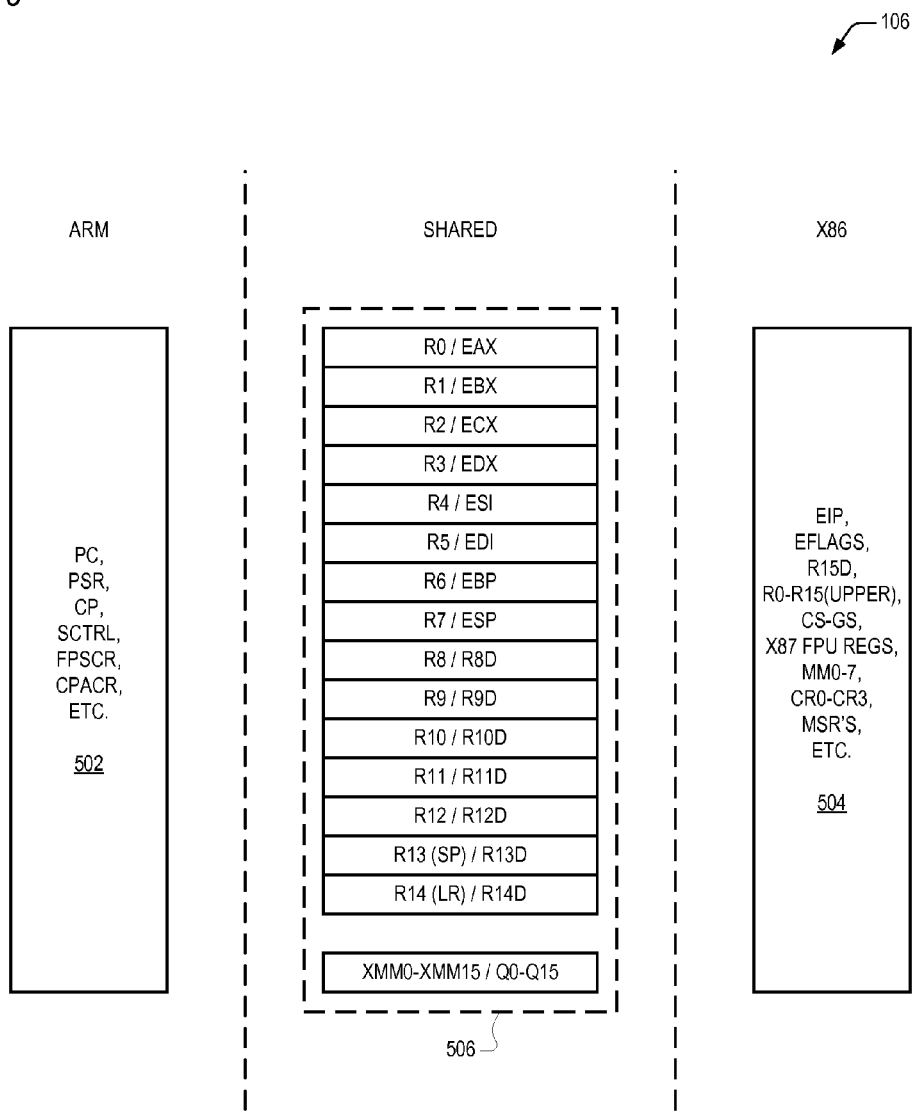
FIG. 5 is a block diagram illustrating in more detail the register file of FIG. 1.

Referring now to FIG. 5, a block diagram illustrating in more detail the register file 106 of FIG. 1 is shown. Preferably register file 106 is implemented as separate physical blocks of registers. In one embodiment, the general purpose registers are implemented in one physical register file having a plurality of read ports and write ports; whereas, other registers may be physically located apart from the general purpose register file and proximate functional blocks which access them and may have fewer read/write ports than the general purpose register file. In one embodiment, some of the non-general purpose registers, particularly those that do not directly control hardware of the microprocessor 100 but simply store values used by microcode 234 (e.g., some x86 MSR or ARM coprocessor registers), are implemented in a private random access memory (PRAM) accessible by the microcode 234 but invisible to the x86 ISA and ARM ISA programmer, i.e., not within the ISA system memory address space.

Broadly speaking, the register file 106 is separated logically into three categories, as shown in FIG. 5, namely the ARM-specific registers 502, the x86-specific register 504, and the shared registers 506. In one embodiment, the shared registers 506 include fifteen 32-bit registers that are shared by the ARM ISA registers R0 through R14 and the x86 ISA EAX through R14D registers as well as sixteen 128-bit registers shared by the x86 ISA XMM0 through XMM15 registers and the ARM ISA Advanced SIMD (Neon) registers, a portion of which are also overlapped by the thirty-two 32-bit ARM VFPv3 floating-point registers. As mentioned above with respect to FIG. 1, the sharing of the general purpose registers implies that a value written to a shared register by an x86 ISA instruction 124 will be seen by an ARM ISA instruction 124 that subsequently reads the shared register, and vice versa. This advantageously enables x86 ISA and ARM ISA routines to communicate with one another through registers. Additionally, as mentioned above, certain bits of architectural control registers of the x86 ISA and ARM ISA are also instantiated as shared registers 506. As mentioned above, in one embodiment, the x86 MSRs may be accessed by ARM ISA instructions 124 via an implementation-defined coprocessor register, and are thus shared by the x86 ISA and ARM ISA. The shared registers 506 may also include non-architectural registers, for example non-architectural equivalents of the condition flags, that are also renamed by the RAT 402. The hardware instruction translator 104 is aware of which registers are shared by the x86 ISA and ARM ISA so that it may generate the implementing microinstructions 126 that access the correct registers.

The ARM-specific registers 502 include the other registers defined by the ARM ISA that are not included in the shared registers 506, and the x86-specific registers 504 include the other registers defined by the x86 ISA that are not included in the shared registers 506. Examples of the ARM-specific registers 502 include the ARM PC 116, CPSR, SCTRL, FPSCR, CPACR, coprocessor registers, banked general purpose registers and SPSRs of the various exception modes, and so forth. The foregoing is not intended as an exhaustive list of the ARM-specific registers 502, but is merely provided as an illustrative example. Examples of the x86-specific registers 504 include the x86 EIP 118, EFLAGS, R15D, upper 32 bits of the 64-bit R0-R15 registers (i.e., the portion not in the shared registers 506), segment registers (SS, CS, DS, ES, FS, GS), x87 FPU registers, MMX registers, control registers (e.g., CR0-CR3, CR8), and so forth. The foregoing is not intended as an exhaustive list of the x86-specific registers 504, but is merely provided as an illustrative example.

In one embodiment, the microprocessor 100 includes new implementation-defined ARM coprocessor registers that may be accessed when the instruction mode indicator 132 indicates the ARM ISA in order to perform x86 ISA-related operations, including but not limited to: the ability to reset the microprocessor 100 to an x86 ISA processor (reset-to-x86 instruction); the ability to initialize the x86-specific state of the microprocessor 100, switch the instruction mode indicator 132 to x86, and begin fetching x86 instructions 124 at a specified x86 target address (launch-x86 instruction); the ability to access the global configuration register discussed above; the ability to access x86-specific registers (e.g., EFLAGS), in which the x86 register to be accessed is identified in the ARM R0 register, power management (e.g., P-state and C-state transitions), processor bus functions (e.g., I/O cycles), interrupt controller access, and encryption acceleration functionality access, as discussed above. Furthermore, in one embodiment, the microprocessor 100 includes new x86 non-architectural MSRs that may be accessed when the instruction mode indicator 132 indicates the x86 ISA in order to perform ARM ISA-related operations, including but not limited to: the ability to reset the microprocessor 100 to an ARM ISA processor (reset-to-ARM instruction); the ability to initialize the ARM-specific state of the microprocessor 100, switch the instruction mode indicator 132 to ARM, and begin fetching ARM instructions 124 at a specified ARM target address (launch-ARM instruction); the ability to access the global configuration register discussed above; the ability to access ARM-specific registers (e.g., the CPSR), in which the ARM register to be accessed is identified in the EAX register.

Figure 6A:
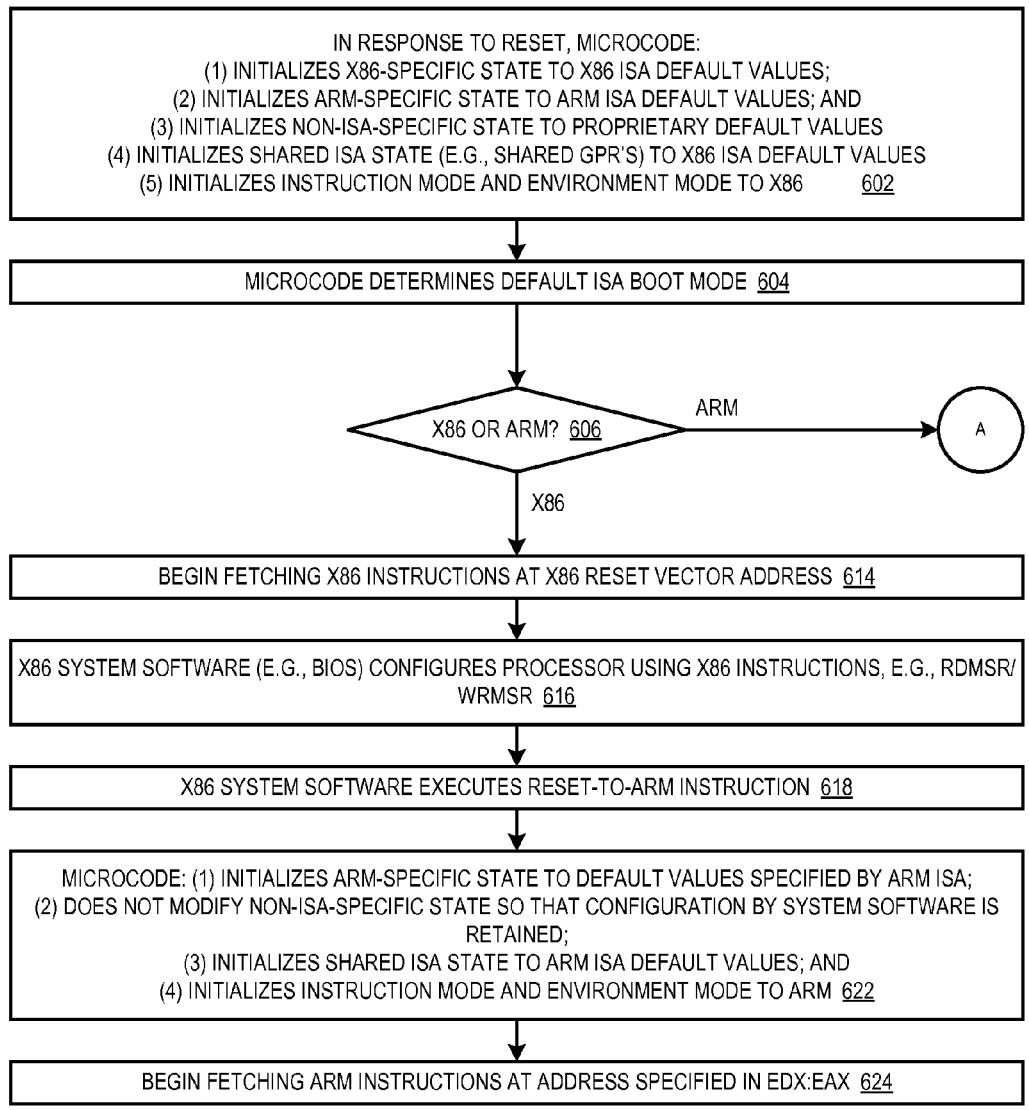
FIG. 6 is a flowchart illustrating operation of the microprocessor of FIG. 1.
Figure 6B:
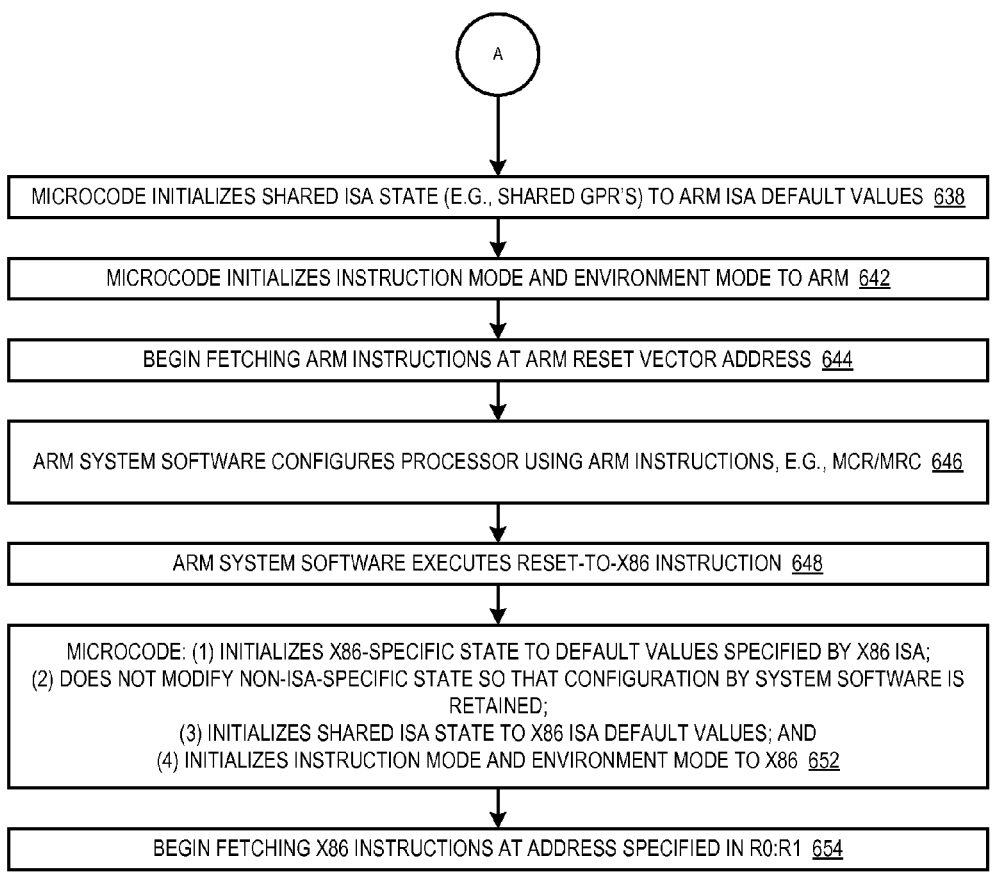

Referring now to FIG. 6, comprising FIGS. 6A and 6B, a flowchart illustrating operation of the microprocessor 100 of FIG. 1 is shown. Flow begins at block 602.

At block 602, the microprocessor 100 is reset. The reset may be signaled on the reset input to the microprocessor 100. Additionally, in an embodiment in which the processor bus is an x86 style processor bus, the reset may be signaled by an x86-style INIT. In response to the reset, the reset routines in the microcode 234 are invoked. The reset microcode: (1) initializes the x86-specific state 504 to the default values specified by the x86 ISA; (2) initializes the ARM-specific state 502 to the default values specified by the ARM ISA; (3) initializes the non-ISA-specific state of the microprocessor 100 to the default values specified by the microprocessor 100 manufacturer; (4) initializes the shared ISA state 506, e.g., the GPRs, to the default values specified by the x86 ISA; and (5) sets the instruction mode indicator 132 and environment mode indicator 136 to indicate the x86 ISA. In an alternate embodiment, instead of actions (4) and (5) above, the reset microcode initializes the shared ISA state 506 to the default values specified by the ARM ISA and sets the instruction mode indicator 132 and environment mode indicator 136 to indicate the ARM ISA. In such an embodiment, the actions at blocks 638 and 642 would not need to be performed, and before block 614 the reset microcode would initialize the shared ISA state 506 to the default values specified by the x86 ISA and set the instruction mode indicator 132 and environment mode indicator 136 to indicate the x86 ISA. Flow proceeds to block 604.

At block 604, the reset microcode determines whether the microprocessor 100 is configured to boot as an x86 processor or as an ARM processor. In one embodiment, as described above, the default ISA boot mode is hardcoded in microcode but may be modified by blowing a configuration fuse and/or by a microcode patch. In another embodiment, the default ISA boot mode is provided as an external input to the microprocessor 100, such as an external input pin. Flow proceeds to decision block 606. At decision block 606, if the default ISA boot mode is x86, flow proceeds to block 614; whereas, if the default ISA boot mode is ARM, flow proceeds to block 638.

At block 614, the reset microcode causes the microprocessor 100 to begin fetching x86 instructions 124 at the reset vector address specified by the x86 ISA. Flow proceeds to block 616.

At block 616, the x86 system software, e.g., BIOS, configures the microprocessor 100 using, for example, x86 ISA RDMSR and WRMSR instructions 124. Flow proceeds to block 618.

At block 618, the x86 system software does a reset-to-ARM instruction 124. The reset-to-ARM instruction causes the microprocessor 100 to reset and to come out of the reset as an ARM processor. However, because no x86-specific state 504 and no non-ISA-specific configuration state is changed by the reset-to-ARM instruction 126, it advantageously enables x86 system firmware to perform the initial configuration of the microprocessor 100 and then reboot the microprocessor 100 as an ARM processor while keeping intact the non-ARM configuration of the microprocessor 100 performed by the x86 system software. This enables "thin" micro-boot code to boot an ARM operating system without requiring the micro-boot code to know the complexities of how to configure the microprocessor 100. In one embodiment, the reset-to-ARM instruction is an x86 WRMSR instruction to a new non-architectural MSR. Flow proceeds to block 622.

At block 622, the simple instruction translator 204 traps to the reset microcode in response to the complex reset-to-ARM instruction 124. The reset microcode initializes the ARM-specific state 502 to the default values specified by the ARM ISA. However, the reset microcode does not modify the non-ISA-specific state of the microprocessor 100, which advantageously preserves the configuration performed at block 616. Additionally, the reset microcode initializes the shared ISA state 506 to the default values specified by the ARM ISA. Finally, the reset microcode sets the instruction mode indicator 132 and environment mode indicator 136 to indicate the ARM ISA. Flow proceeds to block 624.

At block 624, the reset microcode causes the microprocessor 100 to begin fetching ARM instructions 124 at the address specified in the x86 ISA EDX:EAX registers. Flow ends at block 624.

At block 638, the reset microcode initializes the shared ISA state 506, e.g., the GPRs, to the default values specified by the ARM ISA. Flow proceeds to block 642.

At block 642, the reset microcode sets the instruction mode indicator 132 and environment mode indicator 136 to indicate the ARM ISA. Flow proceeds to block 644.

At block 644, the reset microcode causes the microprocessor 100 to begin fetching ARM instructions 124 at the reset vector address specified by the ARM ISA. The ARM ISA defines two reset vector addresses selected by an input. In one embodiment, the microprocessor 100 includes an external input to select between the two ARM ISA-defined reset vector addresses. In another embodiment, the microcode 234 includes a default selection between the two ARM ISA-defined reset vector addresses, which may be modified by a blown fuse and/or microcode patch. Flow proceeds to block 646.

At block 646, the ARM system software configures the microprocessor 100 using, for example, ARM ISA MCR and MRC instructions 124. Flow proceeds to block 648.

At block 648, the ARM system software does a reset-to-x86 instruction 124. The reset-to-x86 instruction causes the microprocessor 100 to reset and to come out of the reset as an x86 processor. However, because no ARM-specific state 502 and no non-ISA-specific configuration state is changed by the reset-to-x86 instruction 126, it advantageously enables ARM system firmware to perform the initial configuration of the microprocessor 100 and then reboot the microprocessor 100 as an x86 processor while keeping intact the non-x86 configuration of the microprocessor 100 performed by the ARM system software. This enables "thin" micro-boot code to boot an x86 operating system without requiring the micro-boot code to know the complexities of how to configure the microprocessor 100. In one embodiment, the reset-to-x86 instruction is an ARM MRC/MRCC instruction to a new implementation-defined coprocessor register. Flow proceeds to block 652.

At block 652, the simple instruction translator 204 traps to the reset microcode in response to the complex reset-to-x86 instruction 124. The reset microcode initializes the x86-specific state 504 to the default values specified by the x86 ISA. However, the reset microcode does not modify the non-ISA-specific state of the microprocessor 100, which advantageously preserves the configuration performed at block 646. Additionally, the reset microcode initializes the shared ISA state 506 to the default values specified by the x86 ISA. Finally, the reset microcode sets the instruction mode indicator 132 and environment mode indicator 136 to indicate the x86 ISA. Flow proceeds to block 654.

At block 654, the reset microcode causes the microprocessor 100 to begin fetching x86 instructions 124 at the address specified in the ARM ISA R1:R0 registers. Flow ends at block 654.

Figure 7:
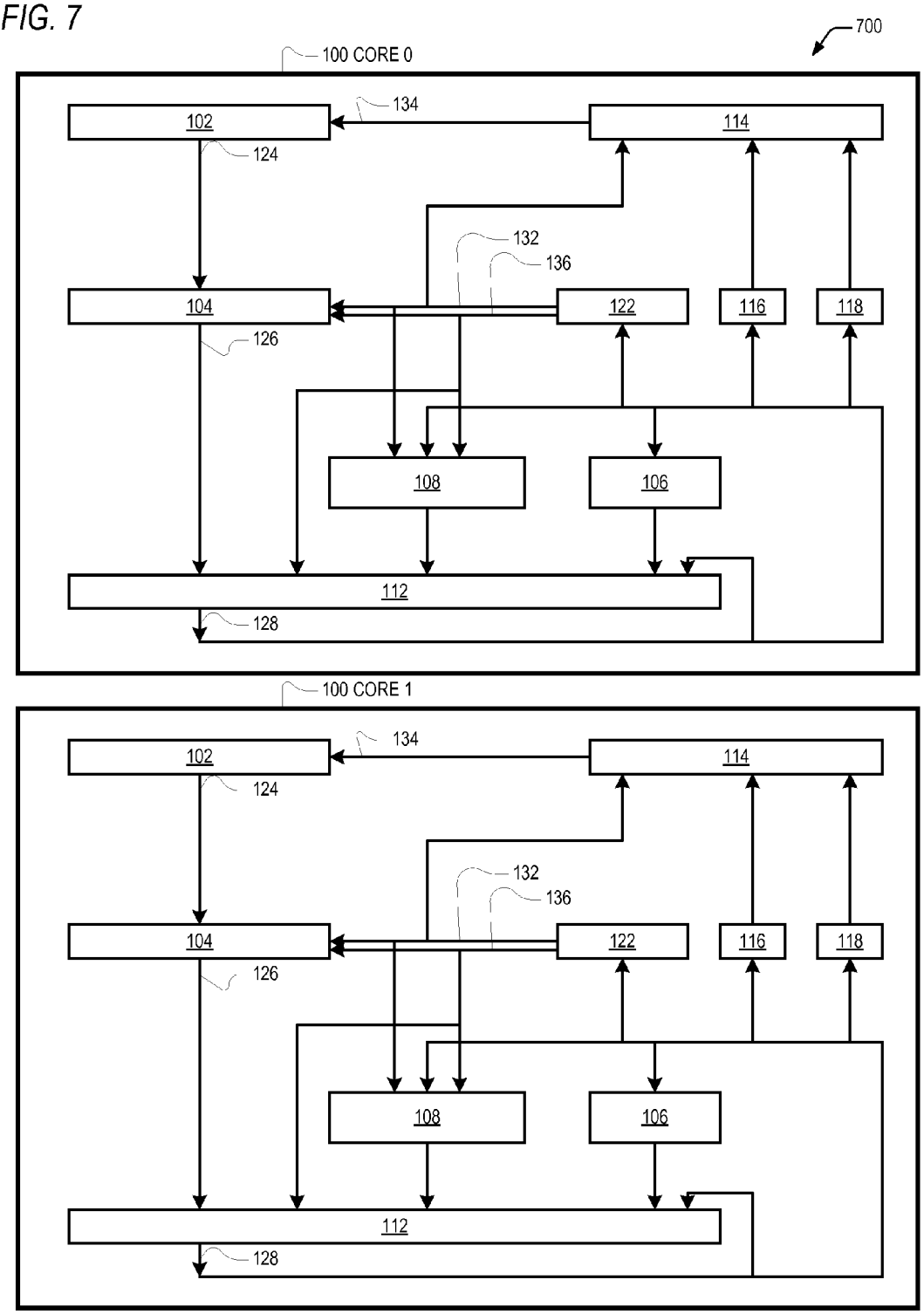
FIG. 7 is a block diagram illustrating a dual-core microprocessor according to the present invention.

Referring now to FIG. 7, a block diagram illustrating a dual-core microprocessor 700 according to the present invention is shown. The dual-core microprocessor 700 includes two processing cores 100 in which each core 100 includes the elements of the microprocessor 100 of FIG. 1 such that it can perform both x86 ISA and ARM ISA machine language programs. The cores 100 may be configured such that both cores 100 are running x86 ISA programs, both cores 100 are running ARM ISA programs, or one core 100 is running x86 ISA programs while the other core 100 is running ARM ISA programs, and the mix between these three configurations may change dynamically during operation of the microprocessor 700. As discussed above with respect to FIG. 6, each core 100 has a default value for its instruction mode indicator 132 and environment mode indicator 136, which may be inverted by a fuse and/or microcode patch, such that each core 100 may individually come out of reset as an x86 or an ARM processor. Although the embodiment of FIG. 7 includes two cores 100, in other embodiments the microprocessor 700 includes more than two cores 100, each capable of running both x86 ISA and ARM ISA machine language programs.

Figure 8:
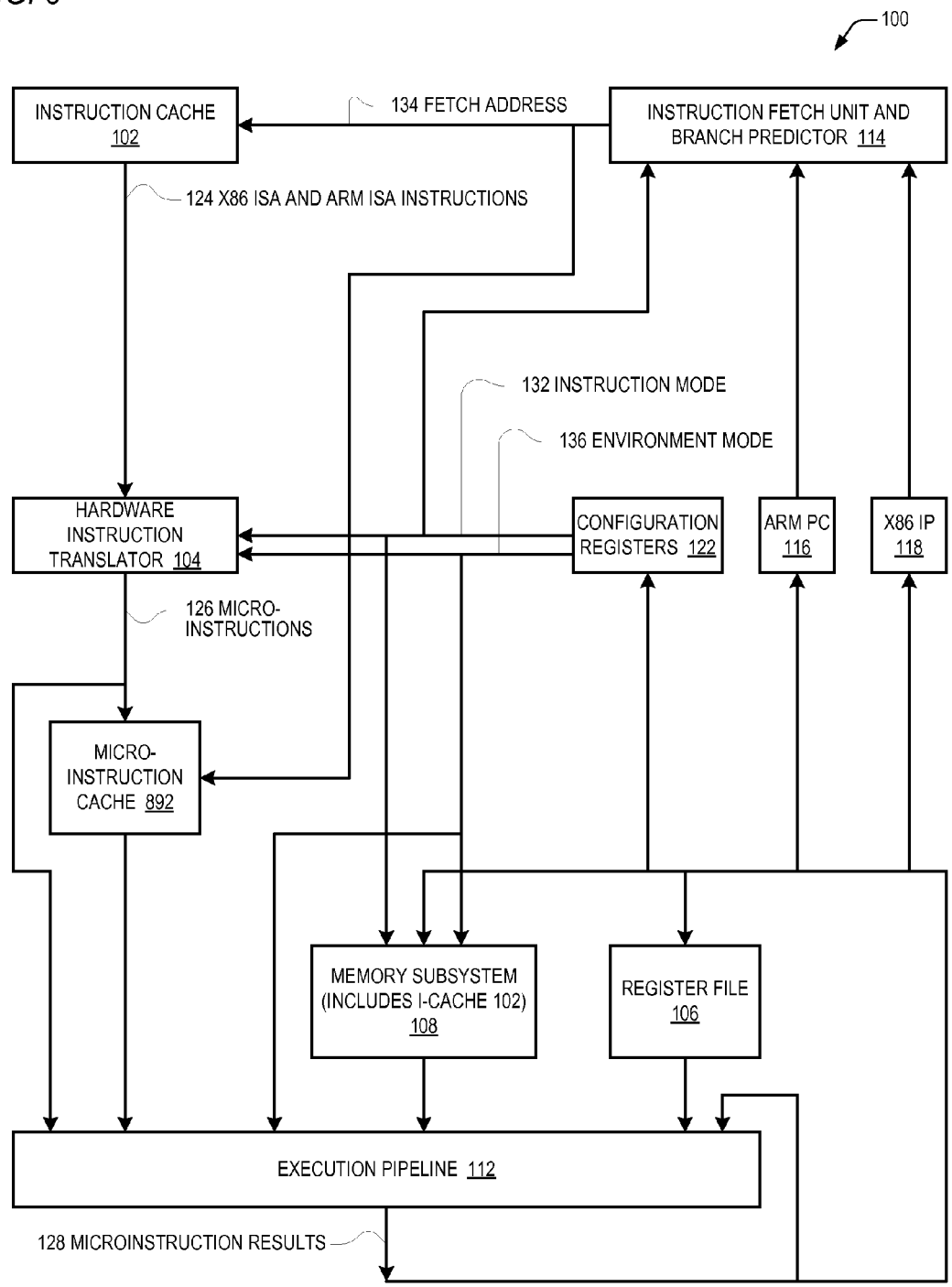
FIG. 8 is a block diagram illustrating a microprocessor that runs x86 ISA and ARM ISA machine language programs according to an alternate embodiment of the present invention.

Referring now to FIG. 8, a block diagram illustrating a microprocessor 100 that can perform x86 ISA and ARM ISA machine language programs according to an alternate embodiment of the present invention is shown. The microprocessor 100 of FIG. 8 is similar to the microprocessor 100 of FIG. 1 and like-numbered elements are similar. However, the microprocessor 100 of FIG. 8 also includes a microinstruction cache 892. The microinstruction cache 892 caches microinstructions 126 generated by the hardware instruction translator 104 that are provided directly to the execution pipeline 112. The microinstruction cache 892 is indexed by the fetch address 134 generated by the instruction fetch unit 114. If the fetch address 134 hits in the microinstruction cache 892, then a mux (not shown) within the execution pipeline 112 selects the microinstructions 126 from the microinstruction cache 892 rather than from the hardware instruction translator 104; otherwise, the mux selects the microinstructions 126 provided directly from the hardware instruction translator 104. The operation of a microinstruction cache, also commonly referred to as a trace cache, is well-known in the art of microprocessor design. An advantage provided by the microinstruction cache 892 is that the time required to fetch the microinstructions 126 from the microinstruction cache 892 is typically less than the time required to fetch the ISA instructions 124 from the instruction cache 102 and translate them into the microinstructions 126 by the hardware instruction translator 104. In the embodiment of FIG. 8, as the microprocessor 100 runs an x86 or ARM ISA machine language program, the hardware instruction translator 104 may not need to perform the hardware translation each time it performs an x86 or ARM ISA instruction 124, namely if the implementing microinstructions 126 are already present in the microinstruction cache 892.

Advantageously, embodiments of a microprocessor are described herein that can run both x86 ISA and ARM ISA machine language programs by including a hardware instruction translator that translates both x86 ISA and ARM ISA instructions into microinstructions of a microinstruction set distinct from the x86 ISA and ARM ISA instruction sets, which microinstructions are executable by a common execution pipeline of the microprocessor to which the implementing microinstructions are provided. An advantage of embodiments of the microprocessor described herein is that, by synergistically utilizing the largely ISA-agnostic execution pipeline to execute microinstructions that are hardware translated from both x86 ISA and ARM ISA instructions, the design and manufacture of the microprocessor may require fewer resources than two separately designed and manufactured microprocessors, i.e., one that can perform x86 ISA machine language programs and one that can perform ARM ISA machine language programs. Additionally, embodiments of the microprocessor, particularly those which employ a superscalar out-of-order execution pipeline, potentially provide a higher performance ARM ISA processor than currently exists. Furthermore, embodiments of the microprocessor potentially provide higher x86 and ARM performance than a system that employs a software translator. Finally, the microprocessor may be included in a system on which both x86 and ARM machine language programs can be run concurrently with high performance due to its ability to concurrently run both x86 ISA and ARM ISA machine language programs.

Control and Status Register Mapping

As described above, the configuration registers 122 of FIG. 1 control various aspects of the operation of the microprocessor 100. The configuration registers 122 are also referred to herein as control and status registers 122. Typically, but not exclusively, the control and status registers 122 are read and written by system firmware (e.g., BIOS) and system software (e.g., operating system) to configure the microprocessor 100 as desired.

The x86 ISA provides a general mechanism for accessing control and status registers. In the x86 ISA, many of the control and status registers are referred to as model specific registers (MSR) that may be read and written via Read MSR (RDMSR) and Write MSR (WRMSR) instructions, respectively. More specifically, the RDMSR instruction reads into the EDX:EAX registers the contents of the 64-bit MSR whose address is specified in the ECX register; conversely, the WRMSR instruction writes the contents of the EDX:EAX registers to the 64-bit MSR whose address is specified in the ECX register. The MSR addresses are defined by the microprocessor manufacturer.

Advantageously, embodiments are described that provide a mechanism for ARM ISA programs to access the x86 MSRs 122 of the microprocessor 100 of FIG. 1. More specifically, the microprocessor 100 employs the ARM ISA Coprocessor register mechanism to access the x86 MSRs 122.

The Move to ARM Register from Coprocessor (MRC) instruction and the Move to two ARM Registers from Coprocessor (MRRC) instruction move the contents of a coprocessor (CP) to one or two 32-bit general purpose registers, respectively. The Move to Coprocessor from ARM Register (MCR) instruction and the Move to Coprocessor from two ARM Registers (MCRR) instruction move to a CP the contents of one or two 32-bit general purpose registers, respectively. The CP are identified by a CP number. Advantageously, when an MCR/MCRR/MRC/MRRC instruction 124 specifies a predetermined implementation-defined coprocessor register of the ARM ISA coprocessor register space, the microprocessor 100 understands that the instruction 124 is instructing it to access (i.e., write/read) an MSR 122. In one embodiment, the MSR 122 address is specified in a predetermined ARM ISA general purpose register. Thus, in this manner the MSRs 122 of the microprocessor 100 are shared by the x86 ISA and ARM ISA, as described above and as described in more detail here.

Examples of aspects of the operation of the microprocessor 100 controlled by the MSRs 122 include, but are not limited to: memory order buffer (MOB) control and status; page fault error codes; clearing of page directory cache and TLB entries; control of the various cache memories in the cache hierarchy of the microprocessor 100, such as disabling portions or all of a cache, removing power from portions or all of a cache, and invalidating cache tags; microcode patch mechanism control; debug control; processor bus control; hardware data and instruction pre-fetch control; power management control, such as sleep and wakeup control, P-state and C-state transitions, and disabling clocks or power to various functional blocks; control and status of instruction merging; ECC memory error status; bus parity error status; thermal management control and status; service processor control and status; inter-core communication; inter-die communication; functions related to fuses of the microprocessor 100; voltage regulator module VID control; PLL control; cache snoop control; write-combine buffer control and status; overclocking feature control; interrupt controller control and status; temperature sensor control and status; enabling and disabling of various features, such as encryption/decryption, MSR password protection, making parallel requests to the L2 cache and the processor bus, individual branch prediction features, instruction merging, microinstruction timeout, performance counters, store forwarding, and speculative tablewalks; load queue size; cache memory size; control of how accesses to undefined MSRs are handled; and multi-core configuration. Many of these aspects are generic to the operation of the microprocessor 100, i.e., they are non-specific to the x86 ISA and to the ARM ISA. That is, a generic aspect of the operation of the microprocessor affects the processing of instructions regardless of the particular ISA indicated by the instruction mode indicator 132. For example, bits in a control register may determine the configuration of a cache memory, such as deselecting a column of bitcells in a cache memory that is bad and replacing the bad column with a redundant column of bitcells. This configuration of the cache memory affects the operation of the microprocessor 100 for all ISA and is therefore a generic aspect of its operation. Other examples of generic aspects of the microprocessor's 100 operation are the duty cycle and/or clock ratio of phase-locked loops (PLLs) of the microprocessor 100 and the setting voltage identifier (VID) pins that control a voltage source to the microprocessor 100. Generally, the generic MSRs 122, rather than the x86-specific MSRs 122, are accessed by the ARM ISA instructions 124.

As mentioned above, in one embodiment, the microprocessor 100 is an enhancement of a commercially available microprocessor that is capable of running x86 ISA programs, and more particularly is capable of performing x86 ISA RDMSR/WRMSR instructions to access the MSRs 122. The commercially available microprocessor is enhanced according to the embodiments described herein to provide MSR 122 access to ARM ISA programs. In one embodiment, the ROM instructions 247 output by the microcode ROM 234 are used by the complex instruction translator 206 of FIG. 2 to generate the microinstructions 126 that implement the RDMSR/WRMSR instructions. An advantage of such an embodiment is that adding the ability for ARM ISA MRC/MRRC/MCR/MCRR instructions to access the MSR generic control and status registers only requires the addition of a relatively small amount of microcode 234 to the existing microcode 234 that provides the ability for x86 ISA RDMSR/WRMSR instructions to access them.

Figure 9:
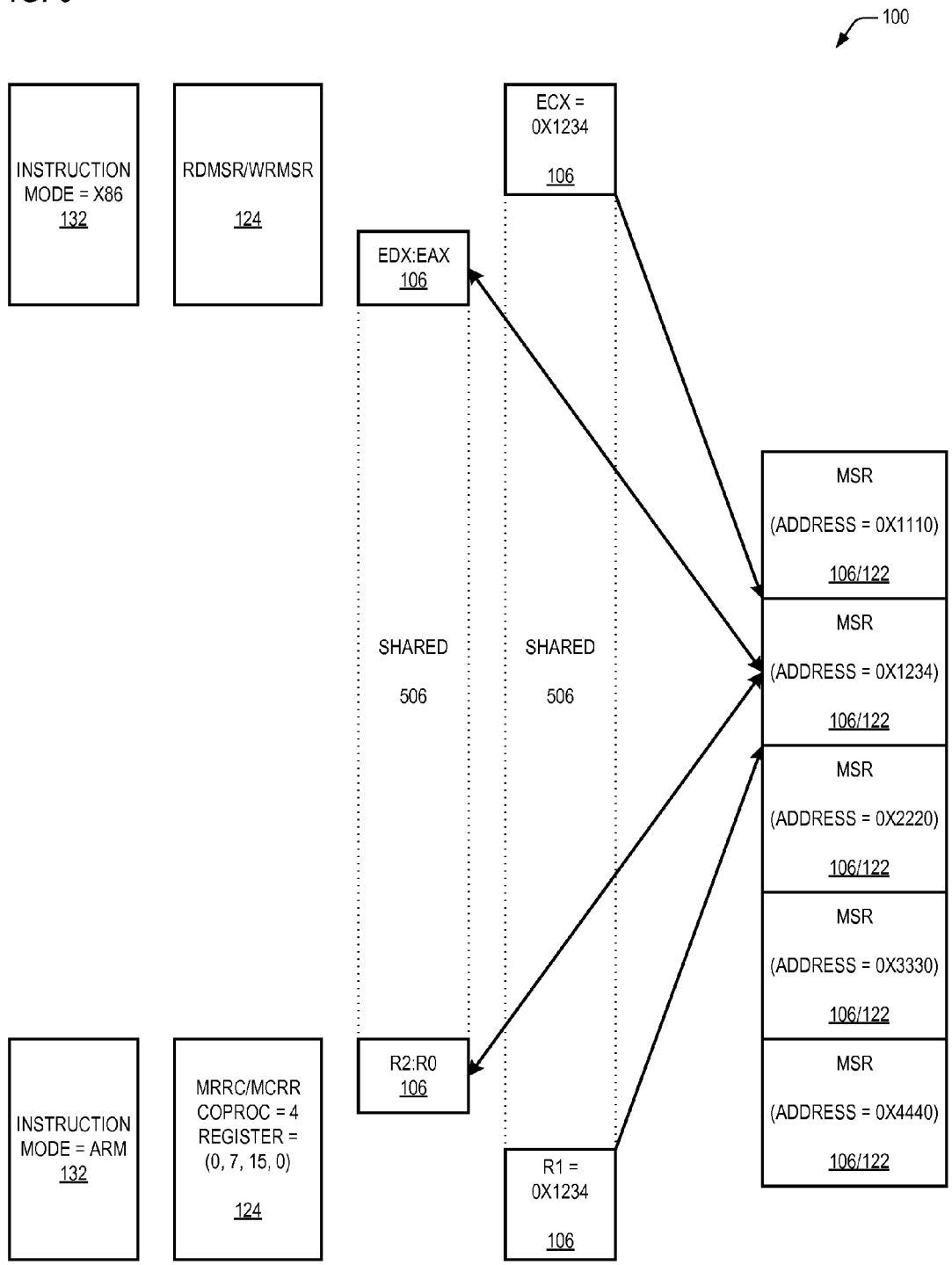
FIG. 9 is a block diagram illustrating operation of the microprocessor to enable both x86 ISA and ARM ISA programs to access MSRs of the microprocessor of FIG. 1.

Referring now to FIG. 9, a block diagram illustrating operation of the microprocessor 100 to enable both x86 ISA and ARM ISA programs to access MSRs of the microprocessor 100 of FIG. 1 is shown. A plurality of 64-bit MSRs 122 is shown, each having a different MSR address (e.g., 0x1110, 0x1234, 0x2220, 0x3330, 0x4440). As described above, the MSRs 122 may be considered part of the register file 106 of FIG. 1.

FIG. 9 illustrates an x86 ISA program, more specifically an RDMSR/WRMSR instruction 124, accessing one of the MSRs 122 when the instruction mode indicator 132 indicates the x86 ISA. In the example of FIG. 9, the MSR 122 being access has address 0x1234. Therefore, the MSR 122 address value 0x1234 has been stored in the x86 ECX register 106 by the x86 program prior to the RDMSR/WRMSR instruction 124, as specified by the x86 ISA. Additionally, in the case of a RDMSR instruction 124, the microprocessor 100 reads the 64-bit data value from the MSR 122 at address 0x1234 and copies it to the x86 EDX:EAX registers 106, as specified by the x86 ISA; and in the case of a WRMSR instruction 124, the microprocessor 100 copies the 64-bit data value in the x86 EDX:EAX registers 106 to the MSR 122 at address 0x1234, as specified by the x86 ISA.

FIG. 9 also illustrates an ARM ISA program, more specifically an MRRC/MCRR instruction 124, accessing the same MSR 122 at address 0x1234 when the instruction mode indicator 132 indicates the ARM ISA. The MSR 122 address value 0x1234 has been stored in the ARM R1 register 106 by the ARM program prior to the MRRC/MCRR instruction 124. Additionally, in the case of an MRRC instruction 124, the microprocessor 100 reads the 64-bit data value from the MSR 122 at address 0x1234 and copies it to the ARM R2:R0 registers 106; and in the case of an MCRR instruction 124, the microprocessor 100 copies the 64-bit data value in the ARM R2:R0 registers 106 to the MSR 122 at address 0x1234. The MRRC/MCRR instruction 124 specifies a predetermined ARM coprocessor number. In one embodiment, the predetermined ARM coprocessor number is 4. The MRRC/MCRR instruction 124 also specifies a predetermined ARM coprocessor register. In one embodiment, the predetermined ARM coprocessor register is (0, 7, 15, 0), which denotes the values of the CRn, opc1, CRm, and opc2 fields, respectively, in the case of an MRC/MCR instruction 124, and in the case of an MRRC/MCRR instruction 124, denotes that the opc1 field is 7 and the CRm field is 15. In one embodiment, if the ARM ISA instruction 124 is an MRC or MCR instruction, then only the lower 32 bits of the specified 64-bit MSR is read/written.

In one embodiment, as described above, the general purpose registers defined by the x86 ISA and the ARM ISA share an instance of the physical registers of the register file 106. In one embodiment, the mappings are shown in the table below.

| | |
|---|---|
| EAX | R0 |
| ECX | R1 |
| EDX | R2 |
| EBX | R3 |
| ESP | R4 |
| EBP | R5 |
| ESI | R6 |
| EDI | R7 |

As may be observed from the mappings, advantageously the ARM R1 register maps to the x86 ECX register, and the ARM R2:R0 registers map to the x86 EDX:EAX registers, which may simplify the microcode 234.

It should be understood that although embodiments are described in which the predetermined ARM register used to specify the MSR 122 address is the R1 register, other embodiments are contemplated in which the MSR 122 address is specified in other ways, such as, but not limited to: another general purpose register is the predetermined register or specifying the register within the MRRC/MCRR instruction 124 itself. Similarly, although embodiments are described in which the predetermined ARM registers used to hold the data are the R2:R0 registers, other embodiments are contemplated in which the registers used to hold the data is specified in other ways, such as, but not limited to: other general purpose registers are the predetermined registers or specifying the register within the MRRC/MCRR instruction 124 itself Furthermore, although embodiments are described in which the predetermined ARM coprocessor register used to access the MSRs 122 is register (0, 7, 15, 0) of coprocessor 4, other embodiments are contemplated in which another predetermined ARM coprocessor register is used. Finally, although embodiments are described in which the general purpose registers of the x86 and ARM ISA share a physical register file, other embodiments are contemplated in which they are not shared, or in which they are mapped in a different manner than described.

Figure 10:
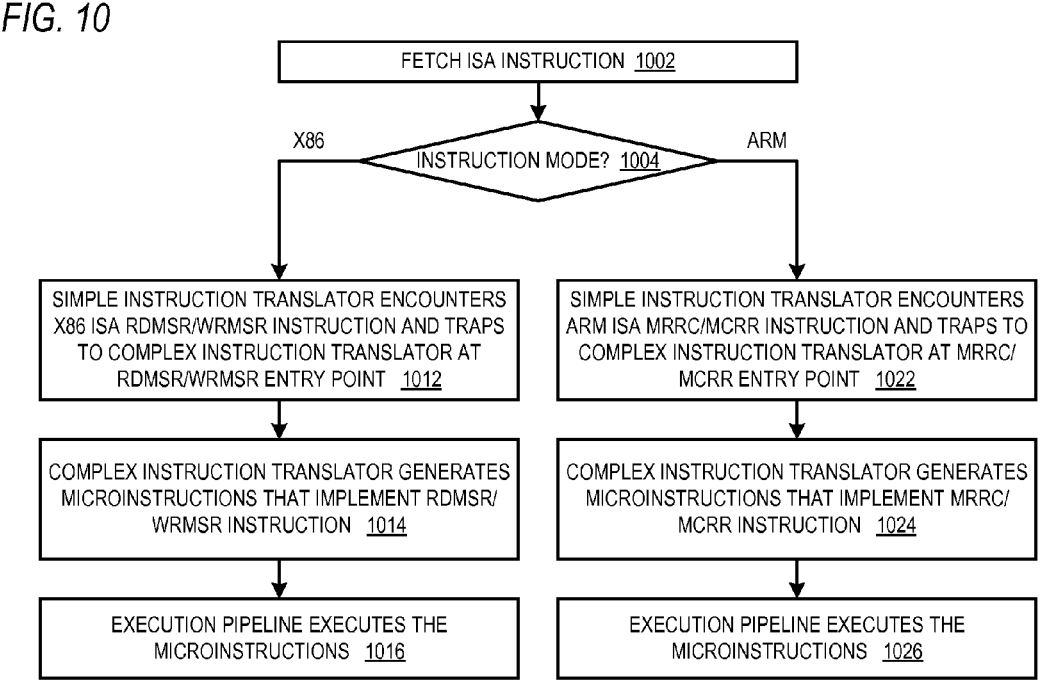
FIG. 10 is a flowchart illustrating operation of the microprocessor of FIG. 1 to perform instructions that access the MSRs.

Referring now to FIG. 10, a flowchart illustrating operation of the microprocessor 100 of FIG. 1 to perform instructions 124 that access the MSRs 122 is shown. Flow begins at block 1002.

At block 1002, the microprocessor 100 fetches an ISA instruction 124 and provides it to the hardware instruction translator 104 of FIG. 1. Flow proceeds to decision block 1004.

At decision block 1004, if the instruction mode indicator 132 indicates the x86 ISA, flow proceeds to block 1012; whereas, if the instruction mode indicator 132 indicates the ARM ISA, flow proceeds to block 1022.

At block 1012, the x86 simple instruction translator 222 of FIG. 2 encounters an x86 ISA RDMSR/WRMSR instruction 124 and traps to the complex instruction translator 206 of FIG. 2. More specifically, the simple instruction translator 204 provides to the micro-PC 232 the microcode address 252 of the entry point for the routine that handles the RDMSR/WRMSR instruction 124 within the microcode ROM 234. Flow proceeds to block 1014.

At block 1014, the complex instruction translator 206 generates microinstructions 126 that implement the RDMSR/WRMSR instruction 124 using the microcode ROM instructions 247 of the routine that handles the RDMSR/WRMSR instruction 124. FIG. 11 illustrates pseudocode of the microcode 234 routines that handle the RDMSR/WRMSR instruction 124. In FIG. 11, TEMP1 and TEMP2 refer to temporary (i.e., non-architectural) 64-bit registers used to store temporary values. Flow proceeds to block 1016.

At block 1016, the execution pipeline 112 executes the microinstructions 126 generated at block 1014 to implement the RDMSR/WRMSR instruction 124. That is, the microinstructions 126 copy the value from the MSR 122 whose address is specified in the ECX register into the EDX:EAX registers in the case of a RDMSR instruction 124, or conversely the microinstructions 126 copy the value from the EDX:EAX registers into the MSR 122 whose address is specified in the ECX register in the case of a WRMSR instruction 124. Flow ends at block 1016.

At block 1022, the ARM simple instruction translator 224 of FIG. 2 encounters an ARM ISA MRRC/MCRR instruction 124 and traps to the complex instruction translator 206. More specifically, the simple instruction translator 204 provides to the micro-PC 232 the microcode address 252 of the entry point for the routine that handles the MRRC/MCRR instruction 124 within the microcode ROM 234. Flow proceeds to block 1024.

At block 1024, the complex instruction translator 206 generates microinstructions 126 that implement the MRRC/MCRR instruction 124 using the microcode ROM instructions 247 of the routine that handles the MRRC/MCRR instruction 124. FIG. 11 also illustrates pseudocode of the microcode 234 routines that handle the MRRC/MCRR instruction 124. As shown in FIG. 11, a common subroutine (RDMSR COMMON) is employed that may be called by both the microcode routine that handles the RDMSR instruction 124 and the microcode routine that handles the MRRC instruction 124; similarly, a common subroutine (WRMSR COMMON) is employed that may be called by both the microcode routine that handles the WRMSR instruction 124 and the microcode routine that handles the MCRR instruction 124. This is advantageous because the bulk of the operations are performed by the common subroutines such that a relatively small amount of microcode 234 is required to support the ARM MRRC/MCRR instructions 124. Additionally, the routines that handle the MRRC/MCRR instructions 124 determine that the predetermined coprocessor number is specified (e.g., coprocessor 4) and that the predetermined coprocessor register is specified (e.g., (0, 7, 15, 0)); otherwise, the microcode branches to routines that handle accesses to other, i.e., non-MSR, coprocessor registers. In one embodiment, the routines also assert that the microprocessor 100 is not in ARM ISA user mode; otherwise, the microcode generates an exception. Additionally, the routines assert that the feature to enable ARM ISA programs to access the MSRs 122 is enabled; otherwise, the microcode treats the MRRC/MCRR instruction 124 as a no-op. Flow proceeds to block 1026.

At block 1026, the execution pipeline 112 executes the microinstructions 126 generated at block 1014 to implement the MRRC/MCRR instruction 124. That is, the microinstructions 126 copy the value from the MSR 122 whose address is specified in the R1 register into the R2:R0 registers in the case of a MRRC instruction 124, or conversely the microinstructions 126 copy the value from the R2:R0 registers into the MSR 122 whose address is specified in the R1 register in the case of a MCRR instruction 124. Flow ends at block 1026.

Although the embodiments shown in FIGS. 9 through 11 refer to MRRC/MCRR instructions 124, as described above embodiments also provide the ability for ARM MCR/MRC instructions 124 to access the lower 32 bits of the MSRs 122. Still further, although embodiments are described in which the MSRs 122 are accessed via MRRC/MCRR/MCR/MRC instructions 124, embodiments are contemplated in which the ARM ISA LDC/STC instructions 124 may be used to access the MSRs 122. That is, the data is loaded/stored from/to memory rather than ARM ISA general purpose registers.

As may be observed from the foregoing, the embodiments described provide an efficient mechanism for ARM ISA programs to access the MSRs 122 of the microprocessor 100. Other embodiments are contemplated in which each MSR 122 has its own coprocessor register number that is specified in the MRRC/MCRR opc1 and CRm fields of the ARM ISA coprocessor register space. A disadvantage of this embodiment is that it may consume a relatively large number of registers in the ARM ISA coprocessor register space. Additionally, it would require significant additions to the existing microcode which would consume significant space in the microcode ROM 234. In one such embodiment, the ECX value (or at least the lower bits) is broken up into pieces and distributed into the opc1 and CRm fields. The microcode assembles the pieces into the original ECX value.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor capable of running both x86 instruction set architecture (ISA) machine language programs and Advanced RISC Machines (ARM) ISA machine language programs, the microprocessor comprising:
a mode indicator, that indicates whether the microprocessor is currently fetching instructions of an x86 ISA or ARM ISA machine language program;
a plurality of x86 model-specific registers (MSRs);
wherein when the mode indicator indicates the microprocessor is currently fetching x86 ISA machine language program instructions, each of the plurality of x86 MSRs is accessible via an x86 ISA RDMSR/WRMSR instruction that specifies an address of the x86 MSR;
wherein when the mode indicator indicates the microprocessor is currently fetching ARM ISA machine language program instructions, each of the plurality of x86 MSRs is accessible via an ARM ISA MRRC/MCRR instruction that specifies the address of the x86 MSR;
a hardware instruction translator, that translates the x86 ISA RDMSR/WRMSR instruction into a first sequence of microinstructions to access the addressed MSR, and that translates the ARM ISA MRRC/MCRR instruction into a second sequence of microinstructions to access the MSR; and
an execution pipeline, that executes the first sequence of microinstructions to perform the x86 ISA RDMSR/WRMSR instruction, and that executes the second sequence of microinstructions to perform the ARM ISA MRRC/MCRR, instruction, wherein the microinstructions are defined by a microinstruction set of the microprocessor, wherein the microinstructions are encoded in a distinct manner from the manner in which the instructions defined by the instruction sets of the x86 ISA and ARM ISA are encoded.

2. The microprocessor of claim 1, wherein the ARM ISA MRRC/MCRR instruction specifies the address of the MSR in a predetermined one of the general purpose registers of the ARM ISA.

3. The microprocessor of claim 2, further comprising:
a register file, having a plurality of hardware general purpose registers, wherein the x86 ISA ECX register and the predetermined one of the general purpose registers of the ARM ISA share the same one of the plurality of hardware registers.

4. The microprocessor of claim 2, wherein the predetermined one of the general purpose registers of the ARM ISA is general purpose register R1.

5. The microprocessor of claim 1, wherein the ARM ISA MRRC/MCRR instruction specifies a predetermined coprocessor in the coprocessor space of the ARM ISA.

6. The microprocessor of claim 5, wherein the predetermined coprocessor in the coprocessor space of the ARM ISA is coprocessor 4.

7. The microprocessor of claim 5, wherein the ARM ISA MRRC/MCRR instruction specifies a predetermined register of the register space of the predetermined coprocessor.

8. The microprocessor of claim 7, wherein the predetermined register of the predetermined coprocessor is specified by coprocessor register address (0, 7, 15, 0).

9. The microprocessor of claim 1, wherein the ARM ISA MRRC/MCRR instruction specifies the data to be read from/written to the MSR in a predetermined two of the general purpose registers of the ARM ISA.

10. The microprocessor of claim 9, further comprising:
a register file, having a plurality of hardware general purpose registers, wherein the x86 ISA EDX:EAX registers and the predetermined two of the general purpose registers of the ARM ISA share the same two of the plurality of hardware registers.

11. The microprocessor of claim 9, wherein the predetermined two of the general purpose registers of the ARM ISA are general purpose registers R2:R0.

12. The microprocessor of claim 1, further comprising:
microcode, comprising a first portion invoked in response to the x86 ISA RDMSR/WRMSR instruction and a second portion invoked in response to the ARM ISA MRRC/MCRR instruction, wherein the second portion transfers control to the first portion.

13. The microprocessor of claim 1, wherein the aspects of the operation of the microprocessor controlled by the plurality of MSRs are non-specific to the x86 ISA and the ARM ISA.

14. A method for operation of a microprocessor capable of running both x86 instruction set architecture (ISA) machine language programs and Advanced RISC Machines (ARM) ISA machine language programs, the microprocessor having a plurality of x86 model-specific registers (MSRs), the microprocessor having a mode indicator the indicates whether the microprocessor is currently fetching instructions of an x86 ISA or ARM ISA machine language program, the method comprising:
accessing one of the plurality of x86 MSRs via an x86 ISA RDMSR/WRMSR instruction that specifies an address of the x86 MSR when the mode indicator indicates the microprocessor is currently fetching x86 ISA machine language program instructions;
translating the x86 ISA RDMSR/WRMSR instruction into a first sequence of microinstructions to access the access the addressed x86 MSR, when the mode indicator indicates the microprocessor is currently fetching x86 ISA machine language program instructions; executing the first sequence of microinstructions to perform the x86 ISA RDMSR/WRMSR instruction;
accessing the one of the plurality of x86 MSRs via an ARM ISA MRRC/MCRR instruction that specifies the address of the x86 MSR when the mode indicator indicates the microprocessor is currently fetching ARM ISA machine language program instructions;
translating the ARM ISA MRRC/MCRR instruction into a second sequence of microinstructions to access the x86 MSR, when the mode indicator indicates the microprocessor is currently fetching ARM ISA machine language program instructions;
wherein said translating is performed by a hardwire instruction translator of the microprocessor;
executing the second sequence of microinstructions to perform the ARM ISA MRRC/MCRR instruction; and
wherein the microinstructions are defined by a microinstruction set of the microprocessor and are encoded in a distinct manner from the manner in which the instructions defined by the instruction sets of the x86 ISA and ARM ISA are encoded.

15. The method of claim 14, wherein the microprocessor includes microcode, comprising a first portion invoked in response to the x86 ISA RDMSR/WRMSR instruction and a second portion invoked in response to the ARM ISA MRRC/MCRR instruction, the method further comprising:
 transferring control to the first portion by the second portion.

16. The method of claim 14, wherein the aspects of the operation of the microprocessor controlled by the plurality of MSRs are non-specific to the x86 ISA and the ARM ISA.

17. A computer program product encoded in at least one computer readable storage medium for use with a computing device, the computer program product comprising:
 computer readable program code embodied in said medium, for specifying a microprocessor capable of running both x86 instruction set architecture (ISA) machine language programs and Advanced RISC Machines (ARM) ISA machine language programs, the computer readable program code comprising:
  first program code for specifying a mode indicator, that indicates whether the microprocessor is currently fetching instructions of an x86 ISA or ARM ISA machine language program; and
  second program code for specifying a plurality of model-specific registers (MSRs), that control aspects of the operation of the microprocessor;
  wherein when the mode indicator indicates the microprocessor is currently fetching x86 ISA machine language program instructions, each of the plurality of MSRs is accessible via an x86 ISA RDMSR/WRMSR instruction that specifies an address of the MSR;
  wherein when the mode indicator indicates the microprocessor is currently fetching ARM ISA machine language program instructions, each of the plurality of MSRs is accessible via an ARM ISA MRRC/MCRR instruction that specifies the address of the MSW:
  third program code for specifying a hardware instruction translator, that translates the x86 ISA RDMSR/WRMSR instruction into a first sequence of microinstructions to access the addressed MSR, and that translates the ARM ISA MRRC/MCRR instruction into a second sequence of microinstructions to access the MSR; and
  fourth program code for specifying an execution pipeline, that executes the first sequence of microinstructions to perform the x86 ISA RDMSR/WRMSR instruction, and that executes the second sequence of microinstructions to perform the ARM ISA MRRC/MCRR instruction, wherein the microinstructions are defined by a microinstruction set of the microprocessor, wherein the microinstructions are encoded in a distinct manner from the manner in which die instructions defined by the instruction sets of the x86 ISA and ARM ISA are encoded.

18. The computer program product of claim 17, wherein the at least one computer readable storage medium is selected from the set of a disk, tape, or other magnetic, optical, or electronic storage medium and a network, wire line, wireless or other communications medium.

* * * * *